United States Patent
Aizono et al.

(10) Patent No.: US 6,792,603 B2
(45) Date of Patent: Sep. 14, 2004

(54) EXECUTION MANAGEMENT METHOD OF PROGRAM ON RECEPTION SIDE OF MESSAGE IN DISTRIBUTED PROCESSING SYSTEM

(75) Inventors: Takeiki Aizono, Kawasaki (JP); Katsumi Kawano, Kawasaki (JP); Kinji Mori, Machida (JP); Nobuyoshi Andou, Sagamihara (JP); Masayuki Orimo, Kawasaki (JP); Shigeki Hirasawa, Sagamihara (JP); Koki Nakashiro, Yokohama (JP); Hisashi Hashimoto, Yokohama (JP); Atsushi Kobayashi, Machida (JP)

(73) Assignee: Hitachi, Ltd., Tokyo (JP)

( * ) Notice: Subject to any disclaimer, the term of this patent is extended or adjusted under 35 U.S.C. 154(b) by 582 days.

(21) Appl. No.: 09/888,657

(22) Filed: Jun. 26, 2001

(65) Prior Publication Data

US 2001/0034755 A1 Oct. 25, 2001

Related U.S. Application Data

(63) Continuation of application No. 08/668,778, filed on Jun. 24, 1996, now Pat. No. 6,282,578.

(30) Foreign Application Priority Data

Jun. 26, 1995 (JP) .............................................. 7-158246
Aug. 28, 1995 (JP) .............................................. 7-218441

(51) Int. Cl.$^7$ .............................................. G06F 15/16
(52) U.S. Cl. ........................ 719/310; 719/313; 709/229
(58) Field of Search ................................. 719/310, 313, 719/302, 318; 709/235, 232, 228, 229; 370/230

(56) References Cited

U.S. PATENT DOCUMENTS

| 5,363,377 A | 11/1994 | Sharpe | 370/314 |
| 5,384,563 A | 1/1995 | Massey | 340/825.21 |
| 5,483,533 A | 1/1996 | Kuba | 370/232 |
| 5,699,519 A | 12/1997 | Shiobara | 709/235 |
| 6,282,578 B1 * | 8/2001 | Aizono et al. | 719/310 |
| 6,314,501 B1 * | 11/2001 | Gulick et al. | 711/153 |
| 6,340,977 B1 * | 1/2002 | Lui et al. | 345/709 |
| 6,546,417 B1 * | 4/2003 | Baker | 709/206 |
| 6,584,568 B1 * | 6/2003 | Dircks et al. | 713/201 |

FOREIGN PATENT DOCUMENTS

| JP | 57146361 | 9/1982 |
| JP | 62256043 | 11/1987 |
| JP | 7-210511 | 8/1995 |

OTHER PUBLICATIONS

"Hitachi Hidec S10a Series Compact PMS Macro Specification Edition", SP-3-226,. 3$^{rd}$ Edition, Oct. 1990 (Translation NOT Available).

M. Takizawa, et al., "Broadcast Communication Algorithms", Information Processing, vol. 34, No. 11, Nov. 1993, pp. 1341-1349.

Patent Abstracts of Japan, Abstract of JP 07210511, 1998.

* cited by examiner

Primary Examiner—Zarni Maung
(74) Attorney, Agent, or Firm—Antonelli, Terry, Stout & Kraus, LLP

(57) ABSTRACT

In a distributed processing system including a plurality of programs distributed in a plurality of processing units and in which a program on reception side performs processing using a message transmitted from a program on transmission side, a management table for managing start of programs on reception side is provided in a processing unit in which the program on reception side is provided. A program utilizing the message transmitted from the transmission side is recognized and the recognized program is started at the start timing indicated in the management table. The start timing of the program set in the management table may be registered previously or the message may include information indicating the start timing.

21 Claims, 30 Drawing Sheets

FIG. 4

| START TYPE NUMBER | START TYPE | |
|---|---|---|
| 1 | PERIOD-OF-TIME START | ~403 |
| 2 | CYCLE START | ~404 |
| 3 | POINT-OF-TIME START | ~405 |

| AP NAME | START TYPE NUMBER | START PARAMETER | | | | | |
|---|---|---|---|---|---|---|---|
| ABC | 1 | 10 | | | | | |
| ABD | 2 | 50 | | | | | |
| ABE | 3 | 2000 | 10 | 5 | 10 | 50 | 30 |
| ABF | 3 | -1 | -1 | -1 | 21 | 30 | 0 |

FIG. 6

| 601 | 602 |
|---|---|
| AP NAME | DATA |

FIG. 7

| 801 | 802 | 803 | 804 | 805 |
|---|---|---|---|---|
| EXECUTION WAITING TIME | AP NAME | MESSAGE STORAGE LOCATION | START PERIOD | FLAG |
|  |  |  |  |  |
|  |  |  |  |  |
|  |  |  |  |  |
| ⋮ | ⋮ | ⋮ | ⋮ | ⋮ |

308

| START TYPE NUMBER | START TYPE | |
|---|---|---|
| 1 | PERIOD-OF-TIME START | ~1303 |
| 2 | CYCLE START | ~1304 |
| 3 | POINT-OF-TIME START | ~1305 |
| 4 | PERIOD-OF-TIME START CANCEL | ~1306 |
| 5 | CYCLE START CANCEL | ~1307 |
| 6 | POINT-OF-TIME START CANCEL | ~1308 |

FIG. 13

| CONTENT CODE (1801) | AP NAME (1802) | | | | START TYPE NUMBER (1803) | START PARAMETER (1804) | | | | | |
|---|---|---|---|---|---|---|---|---|---|---|---|
| CC1 | A1 | A2 | B2 | ··· | 1 | 10 | | | | | |
| CC3 | B1 | C5 | | ··· | 2 | 50 | | | | | |
| | | | | ··· | | | | | | | |

1805 → row 1
1806 → row 2

| CONTENT CODE (1901) | TRANSMISSION RANGE (1902) |
|---|---|
| | |
| | |
| | |
| | |

| AP NAME | CONTENT CODE | PRIORITY | FLAG | MESSAGE STORAGE LOCATION | COTENT CODE | PRIORITY | FLAG | MESSAGE STORAGE LOCATION | ... |
|---|---|---|---|---|---|---|---|---|---|
| AP1 | CC3 | 1 | 1 | 15000 | CC1 | 2 | 0 | 55000 | ... |
| AP2 | CC5 | 3 | 0 | 25000 | CC3 | 1 | 0 | 15000 | ... |
| ... | ... | ... | ... | ... | ... | ... | ... | ... | |

START CONDITION MANAGEMENT TABLE

| 2901 | 2902 | 2903 | | | 2904 | 2905 | | |
|---|---|---|---|---|---|---|---|---|
| AP NAME | START TYPE NUMBER | START PARAMETER | | | START TYPE NUMBER | START PARAMETER | | |
| | | | ⋮ | ⋮ | | | ⋮ | ⋮ |
| | | | ⋮ | ⋮ | | | ⋮ | ⋮ |
| | | | ⋮ | ⋮ | | | ⋮ | ⋮ |
| ⋯ | ⋯ | ⋯ | | | ⋯ | ⋯ | | |

FIG. 21B

CONTENT CODE MANAGEMENT TABLE

| 2911 | 2912 | 2913 | 2914 | | | 2915 | 2916 | | |
|---|---|---|---|---|---|---|---|---|---|
| CONTENT CODE | START AP | START TYPE NUMBER | START PARAMETER | | | START TYPE NUMBER | START PARAMETER | | |
| | | | | ⋮ | ⋮ | | | ⋮ | ⋮ |
| | | | | ⋮ | ⋮ | | | ⋮ | ⋮ |
| | | | | ⋮ | ⋮ | | | ⋮ | ⋮ |
| ⋯ | ⋯ | ⋯ | ⋯ | | | ⋯ | ⋯ | | |

FIG. 23

| EXECUTION CANCEL WAITING TIME | AP NAME | START TYPE NUMBER |
|---|---|---|
| 3101 | 3102 | 3103 |
| | | |
| | | |
| ... | ... | ... |

FIG. 24A

MESSAGE FORMAT

| AP NAME | START TYPE NUMBER | START PARAMETER NUMBER | START TYPE | START PARAMETER | ... | DATA |
|---|---|---|---|---|---|---|

FIG. 24B 3211, 3212, 3213, 3214

| AP1 | 1 | 5000 | 2 | 20 | DATA 1 |
|---|---|---|---|---|---|

FIG. 24C 3221, 3222, 3223, 3224

| AP2 | 3 | 2000 | 3 | 23 | 10 | 30 | 30 | 2 | 50 | DATA 2 |
|---|---|---|---|---|---|---|---|---|---|---|

FIG. 24D 3231, 3232, 3233, 3234

| AP3 | 1 | 8000 | 5 | DATA 3 |
|---|---|---|---|---|

FIG. 24E 3241, 3242, 3243, 3244

| AP4 | 1 | 3000 | 3 | 2001 | 5 | 1 | 20 | 0 | DATA 4 |
|---|---|---|---|---|---|---|---|---|---|

FIG. 24F 3251, 3252, 3253, 3254, 3255, 3256

| AP5 | 1 | 1000 | 2 | 100 | 1 | 5000 | 5 | DATA 5 |
|---|---|---|---|---|---|---|---|---|

FIG. 25A

| | EXECUTION WAITING TIME | AP NAME | MESSAGE STORAGE LOCATION | START PERIOD | FLAG |
|---|---|---|---|---|---|
| 3311 | 5000 | AP1 | 10000 | 0 | 0 |
| 3312 | 5020 | AP1 | 20000 | 20 | 0 |

FIG. 25B

| | EXECUTION CANCEL WAITING TIME | AP NAME | START TYPE NUMBER |
|---|---|---|---|
| 3321 | 8000 | AP3 | 5 |

FIG. 25C

| | EXECUTION WAITING TIME | AP NAME | MESSAGE STORAGE LOCATION | START PERIOD | FLAG |
|---|---|---|---|---|---|
| 3331 | 1000 | AP5 | 30000 | 100 | 0 |

FIG. 25D

| | EXECUTION CANCEL WAITING TIME | AP NAME | START TYPE NUMBER |
|---|---|---|---|
| 3341 | 5000 | AP5 | 5 |

FIG. 34A

| CONTENT CODE | APPLICATION PROGRAM STARTED | START TYPE NUMBER | START PARAMETER | | | |
|---|---|---|---|---|---|---|
| CC1 | LAMP 1 | 3 | 1995 | 3 | 1 | 8 | 30 | 0 |

| CONTENT CODE | APPLICATION PROGRAM STARTED | START TYPE NUMBER | START PARAMETER | | | | | |
|---|---|---|---|---|---|---|---|---|
| CC1 | LAMP 1 | 3 | 1995 | 3 | 1 | 8 | 30 | 0 |
| CC8 | LAMP 3 | 0 | | | | | | |

3421　3422　3423　3424

3410
3411

EXECUTION MANAGEMENT METHOD OF PROGRAM ON RECEPTION SIDE OF MESSAGE IN DISTRIBUTED PROCESSING SYSTEM

This is a Continuation Application of application Ser. No. 08/668,778 filed Jun. 24, 1996, now U.S. Pat. No. 6,282,578.

BACKGROUND OF THE INVENTION

The present invention relates to a method of managing execution of a program in a distributed processing system having a plurality of processors and more particularly to a program execution management method capable of managing a start timing of a program in a processor in a system where the processor receives a message sent from another processor and then executes the program.

There is known a distributed processing system in which processors each having a processing unit are connected through a communication line. In the distributed processing system, instructions, execution results or the like are sent out from a processor to a network as a message. The message is received by another processor and a processing unit in the processor which has received the message performs some processing by using the message. In the distributed processing system, heretofore, when a message is transmitted from a processor on the transmission side to a processor on the reception side and is received by the processor on the reception side, the message is immediately delivered to a processing unit (strictly speaking, a program executed by the processing unit) on the reception side and processing is performed in accordance with the program. For example, JP-A-57-146361 discloses a so-called data driven type program execution, management method in which a program in a processor is started when data necessary to execute the program are taken into the processor from a common transmission path and are all present in a distributed processing system having a plurality of processors connected to the common transmission path.

In such a prior art, the execution timing of a program on the reception side is the time that the message is received and when a network in which an arrival time of the message cannot be forecasted is used, it is impossible to control the execution timing of the program.

On the other hand, there is a technique that when the message is received to the processor on the reception side, the processor stores the message in a buffer memory once and delivers the information to a program when a request is issued from the program in the processor on the reception side. In this system, the message is delivered when requested by the program, while there is no method of controlling the execution timing of the program using the message positively.

The above prior art has a problem that when the message is transmitted from the processor on the transmission side to the program in the processor on the reception side, the transmitted message is delivered to the program only when the message reaches the processor on the reception side or when the program on the reception side issues the reception request and accordingly it is impossible to deliver the message to the program on the reception side at an intended time of the program on the transmission side. Accordingly, when it is desirable to execute the program at the intended time, the program on the transmission side calculates a time required until the message reaches the program on the reception side and must transmit the message by the calculated time earlier than the time that the message is desired to be received. However, even in this method, the information does not necessarily reach the program on the reception side on the desired time exactly. Further, when a message is transmitted from one or a plurality of programs to a plurality of programs, the plurality of programs on the reception side cannot receive information at the same time and accordingly it is further impossible to successfully control delivery and receipt of a plurality of messages among a plurality of processors.

A method of starting a specified program at a specified time involves an "at" command used in UNIX (OS licensed exclusively by X/OPEN company) which is one of an operating system (OS) of a computer. The "at" command includes an argument to which a start time and a program name to be started are given and when the "at" command is inputted, the specified program is started on the start time specified in the argument. However, the "ad" command is the starting method of a program in a single processing unit and is different from that for specifying the start time of the program used in the message transmitted and received between the distributed processing units. Accordingly, the command is different from that relative to starting of the program on the reception side in the distributed processing unit.

It is an object of the present invention to provide an execution management method of a program on the reception side of a message in a distributed processing system in which the message sent from a program on the transmission side is used to enable the program on the reception side to perform processing at a specified time among a plurality of programs distributed in a plurality of processing units.

It is another object of the present invention to provide an execution management method in which information for specifying a kind of a program is given to a message in the program on the transmission side so that the program on the reception side can recognize the kind of the program and be executed at a previously specified timing.

It is a further object of the present invention to provide an execution management method in which information for specifying contents of a message is given to the message in the program on the transmission side so that the program on the reception side can recognize the contents of the message and be executed at a previously specified timing.

It is a still further object of the present invention to provide an execution management method in which information indicating an execution timing of a program in the program on the reception side is caused to be contained in a message sent from the program on the transmission side to thereby be able to control execution of the program on the reception side.

SUMMARY OF THE INVENTION

In order to achieve the above objects, in the present invention, a distributed processing system in which a program on reception side performs processing using a message transmitted from a program on transmission side among a plurality of programs distributed in a plurality of processing units connected through a network is configured as follows.

A management table for managing start of the program on reception side is provided in a processing unit in which the program on reception side is provided. The management table stores information indicating which program is started at which timing. When a message is broadcasted from the program on transmission side to the network, the processing unit on reception side judges from identification information included in the message whether the message is necessary for processing of the program on reception side or not. When it is necessary, the processing unit on reception side receives the message and when it is not necessary, the processing unit on reception side abandons the message.

The processing unit on reception side recognizes a program utilizing the received message and starts the recognized program on reception side at a start timing indicated in the management table. As the start timing, three start timings can be used including a start time of the program on reception side, a timing after an elapse of a designated period of time from reception of the message, and a designated period or cycle after reception of the message.

The management table is provided in a memory unit in each processing unit (or processor) and can be set in a corresponding manner to individual programs or messages transmitted and received between programs. Contents in the management table may be previously set by the operator before transmission of the message or the message including information indicating the start timing of the program on reception side is transmitted and contents in the management table may be rewritten every transmission of the message.

The message broadcasted to the network can adopt various formats such as (1) including a name of a program on reception side and message data, (2) including a content code and message data and (3) after including information indicating the start timing of the program on reception side in addition to (1) and (2). The present invention can be applied to the message which is not broadcasted but is transmitted while designating a specified address.

BRIEF DESCRIPTION OF THE DRAWINGS

FIG. 4 shows a configuration of a start type management table 309 of FIG. 3;

FIG. 5 shows a configuration of a start condition management table 310 of FIG. 3;

FIG. 6 shows a format of a message transmitted over a network 200 of FIG. 3;

FIG. 7 shows a configuration of an execution management table 308 of FIG. 3;

FIG. 13 shows a configuration of a content code management table 1710 of FIG. 12;

FIG. 14 shows a configuration of a transmission range management table 1711 of FIG. 12;

FIG. 18 shows a configuration of a reception message management table in an embodiment 4;

FIGS. 21A and 21B show configuration of a start condition management table and a content code management table in an embodiment 5, respectively;

FIG. 23 shows an execution cancel management table in the embodiment 5;

FIGS. 24A to 24F show formats showing examples of definition information set to messages in the embodiment 5;

FIGS. 25A to 25D shows examples of management information set to the execution management table and the execution cancel management table in the embodiment 5;

FIGS. 34A and 34B show examples of content code management table in the embodiment 3.

DESCRIPTION OF THE PREFERRED EMBODIMENTS

Figure 1:
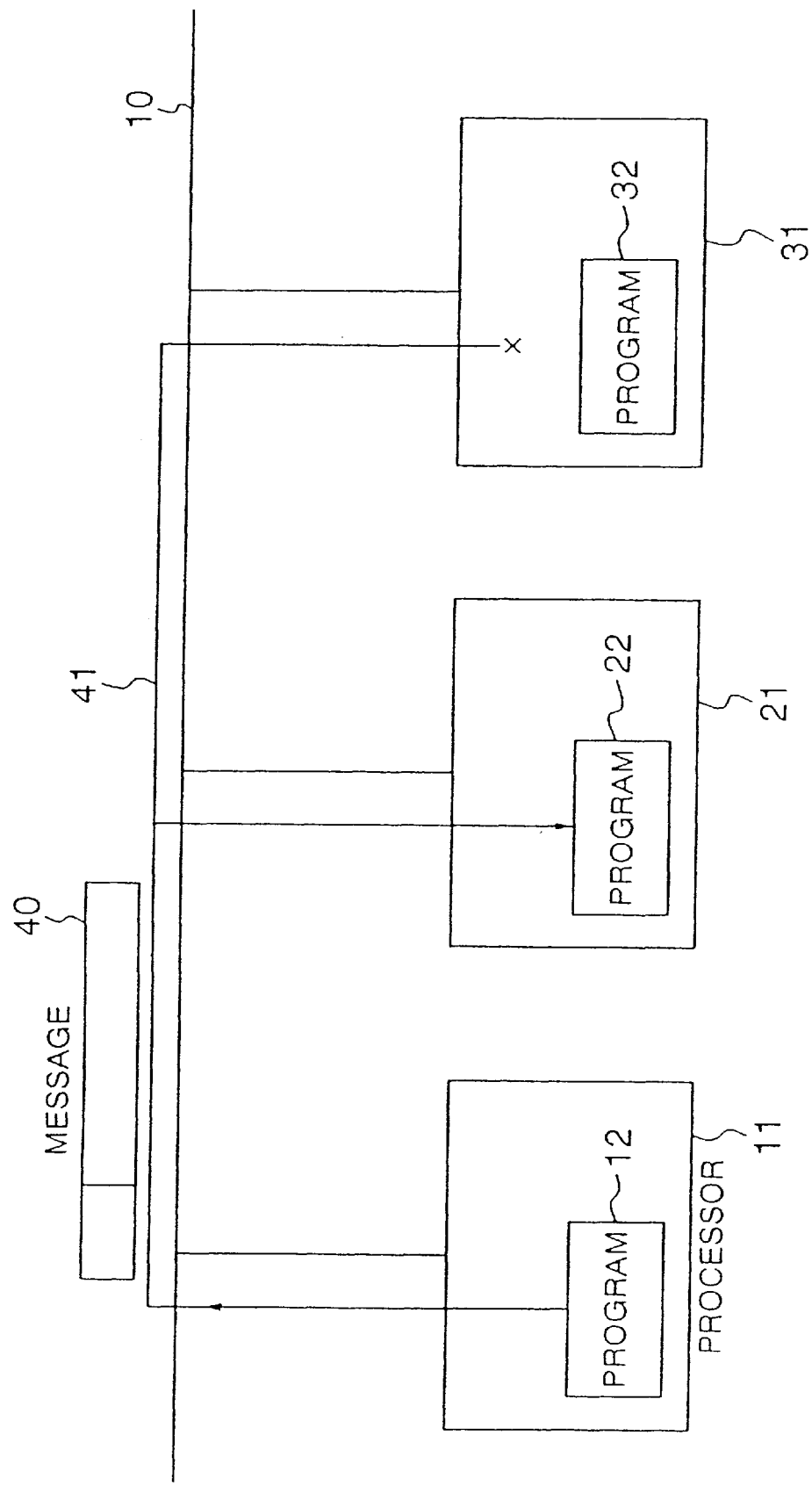
FIG. 1 is a block diagram schematically illustrating a distributed processing system to which the present invention is applied.

FIG. 1 is a block diagram schematically illustrating an embodiment of a distributed processing system to which the present invention is applied. Processors 11, 21 and 31 are connected to a network 10 and transmit and receive a message 40 through the network 10. The processors 11 to 31 includes processing units and memory units (both not shown) for storing data and have programs 12, 22 and 32, respectively. The programs 12, 22 and 32 are not held as source codes but can be stored in the form of object codes capable of being executed by the processor immediately. The network 10 may use any network such as a bus type network and a network using radio. A control unit may use a control process computer, a work station, a personal computer, a PC programmable controller (PC), an intelligent I/O device or the like. In FIG. 1, only three processors are shown but the number of processors is not limited. These are also applied to embodiments to be described below similarly.

In the embodiment, for example, the program 12 of the processor 11 broadcasts the message 40 to the network 10 and the broadcasted message is recognized by other processors 21 and 31, so that the processor 21 which requires the message delivers the message to the program 22 in the processor 21. The processor 31 which does not require the message abandons the message and does not deliver it to the program 32. In this specification, the program 12 which transmits the message is named "program on the transmission side" or "transmission-side program" and the program which receives the message and performs a process is named "program on the reception side" or "reception-side program". The program 32 does not perform transmission and reception of the message 40 and accordingly is neither the transmission-side program nor the reception-side program.

[Embodiment 1]

Figure 3:
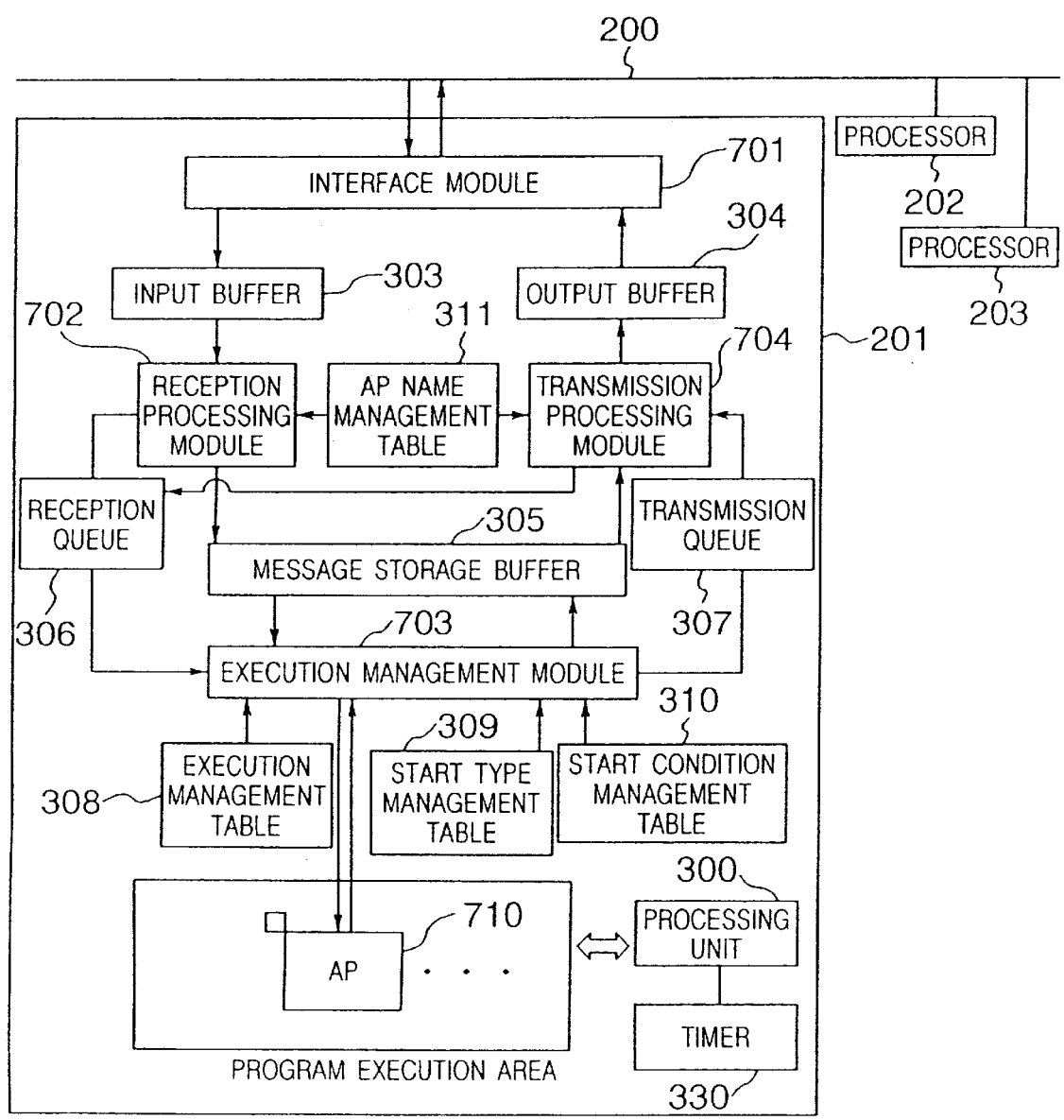
FIG. 3 is a block diagram schematically illustrating a processor of the distributed processing system in the embodiment 1.

FIG. 3 is a block diagram schematically illustrating a processor in the distributed processing system. The configuration of processors 202 and 203 is the same as that of a processor 201. The processor 201 includes a processing unit 300 for controlling the whole of the processor 201, an interface module 701 for connecting the processor to a network. a reception processing module 702 for processing a received message, a transmission processing module 704 for processing a message to be transmitted, and an execution control module 703 for managing execution of a program. These modules are modules constituting a control program executed by the processing unit 300 and the functions of these modules are achieved by the processing unit 300 in the software manner actually.

Further, the processor 201 includes an input buffer 303 in which a message received from the network is stored temporarily, an output buffer 304 in which a message to be transmitted to the network is stored temporarily, a message storage buffer 305 in which a message being in a waiting state for execution of a process is stored, a reception queue 306 which is an FIFO queue for managing the reception order of messages, and a transmission queue 307 which is an FIFO queue for managing the transmission order of messages. Stored in a memory unit not shown are an execution management table 308 used to manage a time taken until execution of an application program (AP) 710, a start type management table 309 for preserving the correspondence of a start type and a start type number, a start condition management table 310 in which information for defining start conditions is stored in a corresponding manner to the application program, and an application program name management table 311 in which a name of the application program loaded in the processor is stored. The start type designates a kind of an application program starting system for managing start of an application program in accordance with a specific time condition after reception of a message.

A timer 330 is used in management of time by the processing unit 300 and is used when a timing for starting the application program 710 is decided.

FIG. 4 shows a configuration of the start type management table 309. The start type management table 309 preserves the correspondence of a start type number (column 401) and a start type (column 402). in the embodiment, the start type includes a period-of-time start, a cycle start and a point-of-time start, The period-of-time start is a start system in which when a predetermined period of time elapses after a message has been received, an application program requiring the message is started. The cycle start is a start system in which after a message has been received, an application program requiring the message is started repeatedly at intervals of a predetermined time. Further, the point-of-time start is a start system in which when a previously designated point of time is reached after a message has been received, an application program requiring the message is started. As apparent from FIG. 4, in the embodiment, a start type number "1" (row 403) is assigned to the period-of-time start, a start type number "2" (row 404) is assigned to the cycle start, and a start type number "3" (row 405) is assigned to the point-of-time start.

FIG. 5 shows a configuration of the start condition management table 310. The start condition management table 310 includes a column 501 in which application program names each identifying an application program are registered, a column 502 in which the start type numbers indicating the start types are registered in a corresponding manner to the application programs, and a column 503 in which start parameters are registered. The start parameters are time information required for performing the period-of-time start, the cycle start and the point-of-time start. A start pattern of each application program can be recognized by referring to the start type management table 309 on the basis of the corresponding start type number. For example, in FIG. 5, row 511 indicates that the application program having the application program name "ABC" has the start type number of "1", that is, the period-of-time start. Further, the start parameter thereof is "10" indicating that the application program "ABC" is started once 10 msec after a message required by the application program "ABC" has been received. Row 512 indicates that the application program "ABD" has the start type number of "2", that is, the cycle start and the start parameter of 50. Accordingly, when a message required by the application program "ABD" is received, the application program "ABD" is started repeatedly every 50 msec. Row 513 indicates that the application program "ABE" has the start type number of "3", that is, the point-of-time start and the start parameter of "2000, 10, 5, 10, 50 and 30". The start parameter of the point-of-time start type has 6 parameters indicating year, month, day, time, minute and second. Accordingly, the application program "ABE" is started once at 10 o'clock 50 minute 30 second on October 5th in 2000. Row 514 indicates that the application program "ABF" has the start type number of 3, that is, the point-of-time start, and the start parameter of "−1, −1, −1, 21, 30 and 00". In the embodiment, the parameter having a negative value is neglected and accordingly the application "ABF" is started once at 21 o'clock 30 minutes 00 seconds every data when a message required by the application program "ABF" is received. The start type number and the start parameter of columns 502 and 503 are set for each application program and are registered in each processor previously. The registration is made by means of the processor having a terminal by an operator and the registered parameter is down-loaded through the network 200 to each processor. In'the embodiment, the start type and the start parameter are defined for each application program and the application program is started on a specific time condition, while the start type and the start parameter may be defined for each unit of execution of any processing treated by the processor such as a task and an object, and the processing may be started on a specific time condition.

Figures 6, 7:
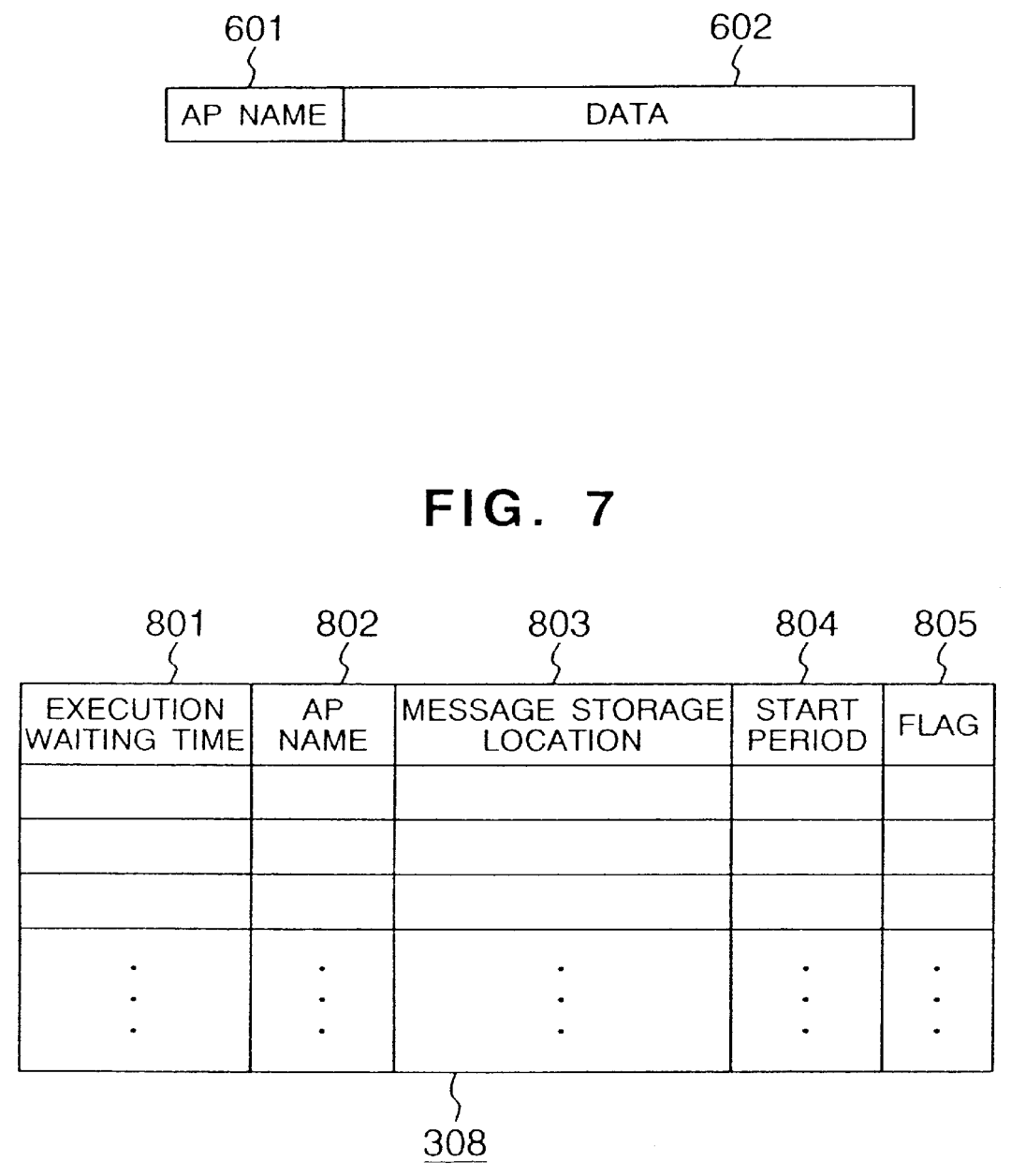

FIG. 7 shows a configuration of the execution management table 308. A name of the application program loaded in the processor is registered in each entry of column 802. Set in each entry of column 801 is a waiting time taken until the application program is started for each application program registered in column 802. Set in each entry of column 803 is information indicating a storage location in the message storage buffer 305 of the message utilized by the application program registered in the corresponding entry of column 802. Set in each entry of column 804 is a start period when the start type of the application program registered in the corresponding entry of column 802 is the cycle start. Set in each entry of column 805 is a flag when the start type of the application program is the point-of-time start.

FIG. 6 shows a format of a message transmitted over the network 200. The message includes an application program name portion 601 corresponding to a header portion in which a name of an application program is set and a data portion 602 in which data are set. The message is broadcasted onto the network 200 and each processor judges on the basis of the name of the application program set in the application program name portion 601 whether it is necessary to receive the message or not.

Figure 2:
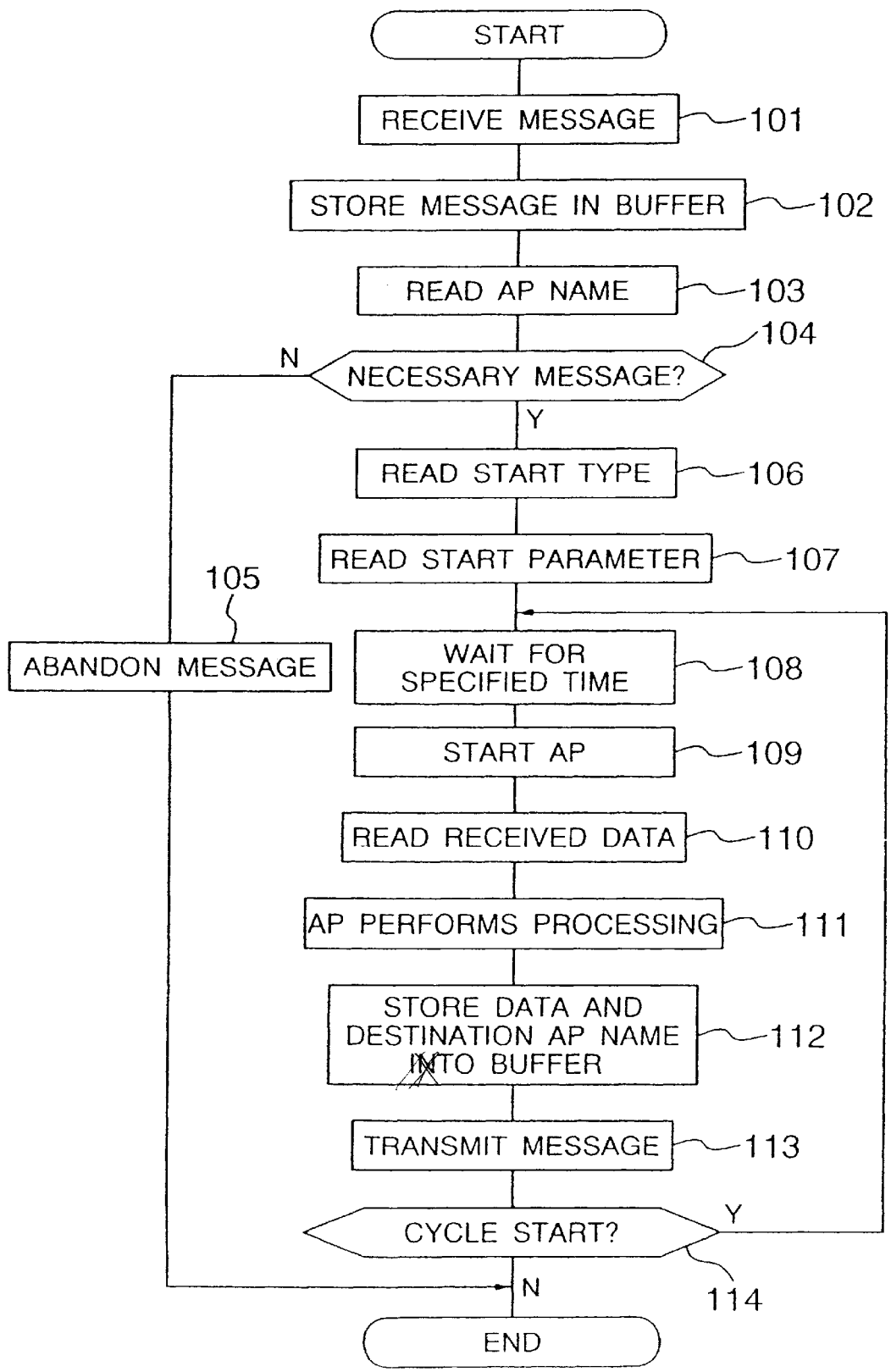
FIG. 2 is a flow chart showing processing performed by a processing unit 300 in an embodiment 1.

FIG. 2 is a flow chart showing processing performed by the processing unit 300 of the processor 201. The message received from the network 200 is stored in the input buffer 303 by the interface module 701 (steps 101 and 102).

When the message is stored in the input buffer 303, the reception processing module 702 reads a name of an application program set in the application program name portion 601 in the message (step 103) and examines whether the same application program name is registered in the application program name management table 311 or not, that is, whether the application program designated by the application program name is loaded in the processor to which the reception processing module 702 itself belongs or not (step 104). When the same application program name is not registered, the message is abandoned (step 105).

When the application program name is registered in the application program name management table 311, the message is stored in the message storage buffer 305 and the storage location of the message is connected (stored) to the reception queue 306 which is an FIFO queue. A message size and the received message are stored in the message storage buffer 305. The execution management module 703 reads the storage locations of the messages from the reception queue 306 successively and processes the messages in order of reception thereof. When the execution management module 703 reads the storage location of the message to be processed next from the reception queue 306, the execution management module 703 reads the application program name in the message stored in the message storage buffer 305 and reads the start type and the start parameter corresponding to the application program name from the start type management table 309 and the start condition management table 310 (steps 106 and 107).

Then, the execution management module 703 sets the message storage location read from the reception queue 306, the application program name requiring the message and the execution waiting time taken until execution of the application program and got from the start type and the start parameter into predetermined entries of the execution management table 308. Further, when the start type of the application program having the application program name set in column 802 is the cycle start, the effect of the start period is set in column 804. When the start type is the point-of-time start, a flag is set in column 805. The message storage location uses a top address of the message in the message storage buffer 305, for example. The execution management module 703 updates the waiting time for execution (value of column 801) by the timer 330 (step 108) and when the waiting time until execution is reduced to 0, the application program is started (step 109). Then, when there is a reception request from the started application program 710, the execution management module 703 stores data in the message stored in the message storage location set in column 803 into a memory area designated by the application program (step 110). The application module 710 then reads the data stored in the designated memory area and performs the processing (step 111). The message in the message storage buffer 305 of which the processing has been completed is erased. The execution management module 703 erases information concerning the started application program when the application program having the execution waiting time reaching 0 is not the cycle start. Further, when the application program is the cycle start, the start period of column 804 is copied to column 801 as the execution waiting time. The execution management module 703 also examines whether the message in the message storage buffer 305 is timed out or not. When the message in—the message storage buffer 305 is not erased for a predetermined time, the message is forcedly erased to prevent overflow of the buffer.

When the application program 710 sends data, the application program 710 stores the data to be transmitted into the message storage buffer 305 while designating the name of the destination-side application program to which data is transmitted, the data to be transmitted and a size of a message and issues a transmission request to the execution management module 703.(step 112). For example, when the program name of the application program 710 is "A-BC" and it is desired to designate "ABD" as a program on the reception side, "ABD" is designated as the AP name 601 and the transmission request is issued.

The execution management module 703 stores the message size, the application program name and the data received from the application program 710 into the message storage buffer.305 and connects the message storage location to the transmission queue 307. The transmission processing module 704 reads the message storage location connected to the transmission queue 307 successively and processes the messages in the message storage buffer in order. The transmission processing module 704 retrieves the application program name in the message from the application program name management table 311. When it is judged that the destination-side application program to which data is transmitted exists within the processor to which the execution management module 703 belongs, the message storage location is connected to the reception queue 306. When the destination-side application program to which data is transmitted does not exist within the processor to which the execution management module 703 belongs, the message is stored in the output buffer 304. The message stored in the output buffer 304 is broadcasted through the interface module 701 to the network 200 (step 113). When the start type of the application program is the cycle start, the application program is started again after elapse of a time designated by the start parameter (step 114). In the case of the cycle start, the same data are repeatedly read by the application program.

In the embodiment 1 described above, the application program is not started only one time immediately after reception of the necessary message and is started in accordance with the time condition based on the previously defined start type. In this manner, the time condition can be added to the linkage between the application program, the object, the task and the like which is a unit of execution of the processor, so that programmers can develop programs without consciousness of the start timing between application programs to thereby improve the program development efficiency. Further, even if the timing adjustment between programs is changed, it is not necessary to compile the program again and the data in the start condition management table 310 are merely changed. In addition, when a system in which a function is employed in programs to stop a process for a fixed time is used, it is difficult to distinguish the stop of the process from stop of a program due to a failure in which the program enters an endless loop due to a bug. However, in the above embodiment, since management of the execution timing of the application program is performed externally of the application program, management of the state of the application program such as identification of the application program in the waiting state can be made easily to thereby improve the maintenance of the system.

[Embodiment 2]

In the embodiment 1, the start condition for each application program provided in each processor is registered in the start condition management table 310 and starting of the application program is controlled on the basis of the start condition. A second embodiment which does not require management of the start condition in each processor is now described. Each processor of the second embodiment has the same configuration as that of the processor of the embodiment 1 except that the start condition management table 310 is not required in FIG. 3 and the configuration of the start type management table 309 is different.

Figures 8, 9:
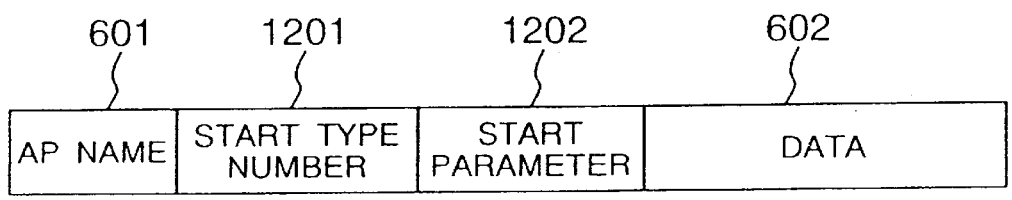
FIG. 8 shows a format of a message transmitted through a network in an embodiment 2.
FIG. 9 shows a configuration of a start type management table 309, in the embodiment 2.

FIG. 8 shows a format of a message transmitted through the network in the embodiment. In the embodiment, the definition information of the start type and the start parameter for the application program is added to the message and is transmitted together with the message. The message includes an application program name portion 601, a start type number portion 1201, a start parameter portion 1202 and a data portion 602. A name for identifying the application program requiring data stored in the data portion 602 is stored in the application program name portion 601. A start type number indicating the start type at the time that the application program specified by the application program name portion 601 is started is set in the start type number portion 1201 and a parameter necessary for the start management is set in the start parameter portion 1202.

FIG. 9 shows a configuration example of a start type management table 309' of the embodiment 2. The start type management table 309' of the embodiment also includes column 1301 in which start types are registered and column 1302 in which definitions of the start type are registered in the same manner as the first embodiment. In the embodiment, as the start type, a period-of-time start cancel (row 1306), a cycle start cancel (row 1307) and a point-of-time start cancel (row 1308) are defined in addition to the period-of-time start (row 1303), the cycle start (row 1304) and the point-of-time start (row 1305). As shown in FIG. 9, "4", "5" and "6" are assigned to the start type numbers of the period-of-time start cancel, the cycle start cancel and the point-of-time start cancel, respectively. The period-of-time start cancel is the start type that starting of the application program being in the start waiting state in the period-of-time start is canceled. The cycle start cancel is the start type that starting of the application program being in the start waiting state in the cycle start is canceled. Further, the point-of-time start cancel is the start type that starting of the application program being in the start waiting state in the point-of-time start is canceled. In any start type, when the application program already starts execution, the execution of the application program is not stopped even if the application program receives the message indicating cancel of the start.

When the period-of-time start cancel, the cycle start cancel or the point-of-time start cancel is desired to be designated as the start type in the format of the message, the message having the respective columns for the start parameter 1202 and the data 602 which are blanked in the format of FIG. 8 is sent. For example, for the message of the period-of-time start cancel, by sending the message having the application program name 601 to which "ACA" is set, the start type number 1201 to which "4" is set and blank columns for the start parameter portion 1202 and the data portion 602 in FIG. 8, the period-of-time start cancel can be designated to the application program "ACA". When the processor receives this message, the processor judges whether the application program "ACA" is in the start waiting state of the period-of-time start within the processor or not and when it is in the start waiting state, the processor cancels the period-of-time start of the application program "ACA". At the same time, the processor cancels the message in the message storage buffer 305 which the application program "ACA" is to receive.

Similarly, for the cycle start cancel, the message having the application program name 601 to which the "ACB" is set, the start type number to which "5" is set and blank columns for the start parameter portion 1202 and the data portion 602 in FIG. 8 can be sent to thereby designate the cycle start cancel to the application program "ACB". When the processor receives this message, the processor judges whether the application program "ACB" is in the start waiting state of the cycle start within the processor or not and when it is in the start waiting state, the processor cancels the cycle start of the application program "ACB". At the same time, the processor cancels the message in the message storage buffer 305 which the application program "ACB" is to receive. The cycle start is canceled not only one time but all of starts after reception of the message are canceled.

Further, the message having the application program name 601 to which "ACC" is set, the start type number 1201 to which "6" is set and blank columns for the start parameter portion 1202 and the data portion 602 in FIG. 8 can be sent to thereby designate the point-of-time start cancel to the application program "ACC". When the processor receives the message, the processor judges whether the application program "ACC" is in the start waiting state of the point-of-time start within the processor or not and when it is in the start waiting state, the processor cancels the point-of-time start of the application program "ACC". At the same time, the processor cancels the message in the message storage buffer 305 which the application program "ACC" is to receive. As described above, when the start pattern is the period-of-time start cancel, the cycle start cancel or the point-of-time start cancel, the start parameter portion 1202 and the data portion 602 are not required and are set to be blank, while even if any information is set to these portions, the information is neglected.

Figure 10:
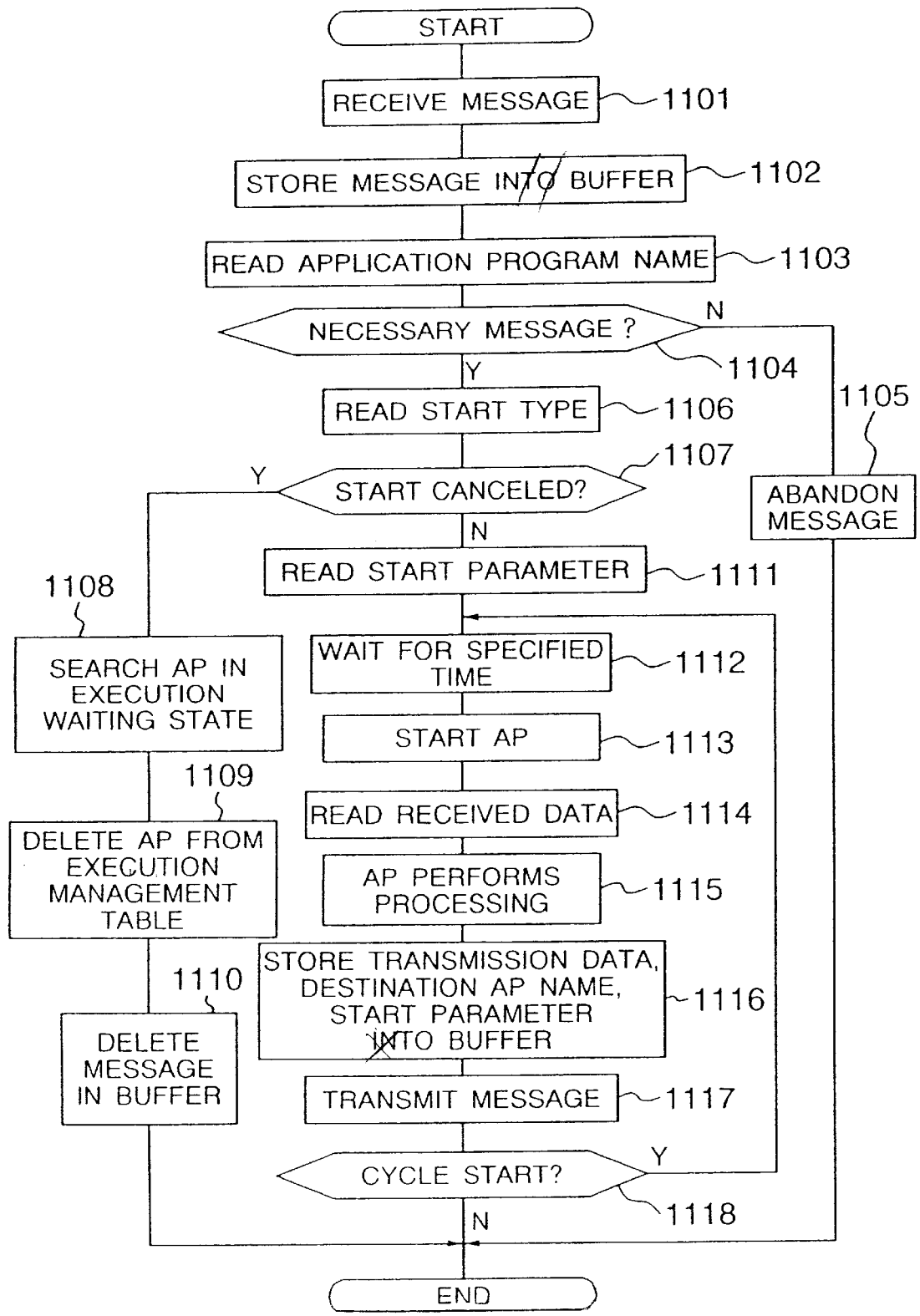
FIG. 10 is a flow chart showing a starting process of an application program in the embodiment 2.

FIG. 10 is a flow chart showing the starting process of the application program in the embodiment 2. When the processor receives the message from the network (step 1101), the processor stores the received message into the input buffer 303 (step 1102). The processor reads the application program name 601 of the received message (step 1103) and judges from the application program name management table 311 whether the application program corresponding to the application program name 601 exists in the application programs loaded in its processor or not (step 1104). When the application program does not exist in its processor, the message stored in the input buffer 303 is abandoned (step 1105) and the process is finished. When the corresponding application program exists in its processor, the start type number portion 1201 is read (step 1106). When the start type in the start type number portion 1201 is any of the period-of-time start cancel, the cycle start cycle and the point-of-time start cancel, the same application program name in the execution management table 310 is searched (step 1108). when the application program name and the start type are coincident, information relative to the application program is eliminated from the execution management table and the start is canceled (step 1109). Further, the message in the message storage buffer 305 which the application program is to read is erased (step 1110).

On the other hand, when the start type of the received message is any of the period-of-time start, the cycle start and the point-of-time start, the processor reads the start parameter portion 1202 in the message (step 1111) and starts the application program designated by the application program name 601 (step 1113) after an elapse of the time set as the start parameter (step 1112). The started application program issues a reception request of data and reads the data within the received message (step 1114) to thereby perform the process using the data (step 1115). After completion of the process, the application program sets a destination-side application program to which data is transmitted, a start type and a start parameter of the destination-side application program and stores them together with data to be transmitted into the message storage buffer 305 (step 1116). At this time, when the star type is any of the period-of-time start cancel, the cycle start cancel and the point-of-time start cancel, it is not necessary to set and store the start parameter and the data to be transmitted. The message stored in the message storage buffer 305 is transmitted to the network when the destination-side application program is not loaded in its processor and the message storage location is connected to the reception queue 306 when the message is loaded in its processor (step 1117). When the start type set in the start type number portion 1201 is the cycle start, the application program is started again after an elapse of the time designated by the start parameter (step 1118). In the cycle start, the same data 602 are read by the application program repeatedly.

In accordance with the embodiment 2, after the processor receives the message, the application program is started on the basis of the time condition given to the message. Accordingly, since the start type and the start parameter are set to the destination-side application program to which data is transmitted upon transmission of the data, the different start type such as the period-of-time start and the period-of-time start cancel can be set to the same application program. Further, since the start type number and the start parameter are given to the message, the message transmitted over the network is analyzed to thereby easily grasp the actual starting situation between the application programs over the processors, the progressive situation of a series of processes in the system and the start timing between the application programs over the processors.

[Embodiment 3]

In the embodiments 1 and 2, the system in which, the start type and the start parameter are defined to the application programs has been described. In the embodiment 3, the system in which the start type and the start parameter are defined to data is now described.

The embodiment 3 is different from the embodiments 1 and 2 in that data are received by any number, including one or more, of application programs and all application programs which receive the data are started on the basis of the start type and the start parameter defined to the data.

Figure 11:
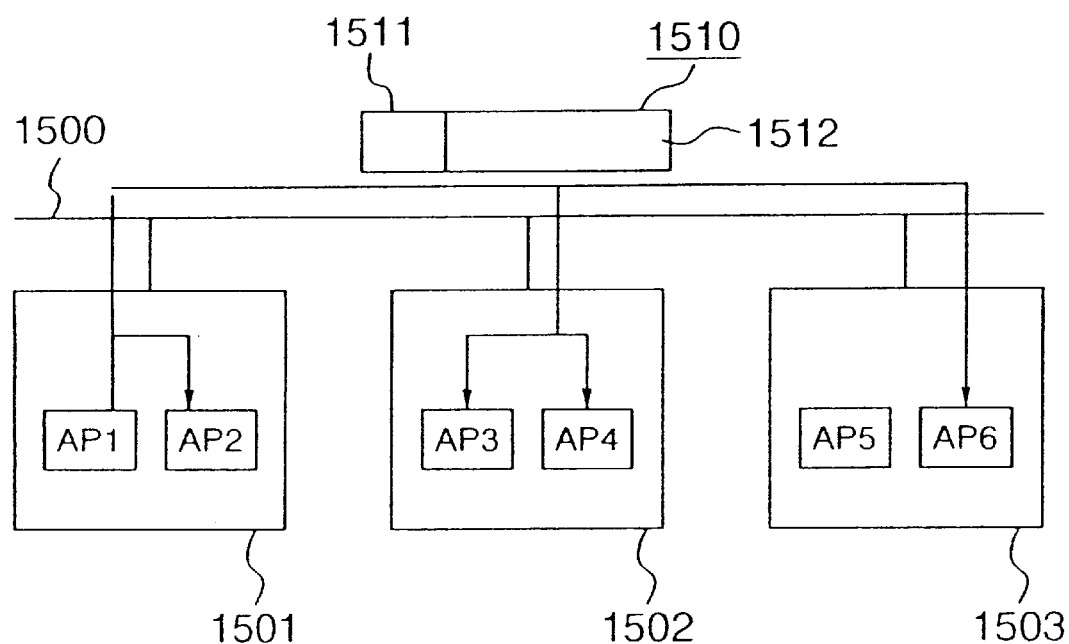
FIG. 11 is a schematic diagram illustrating a multiprocessor system in an embodiment 3.

FIG. 11 is a schematic diagram illustrating a multi-processor system to which the embodiment is applied. Processors 1501, 1502 and 1503 are connected to a network 1500. The processors transmit and receive a message 1510 through the network 1500. The message 1510 includes a content code portion 1511 and a data portion 1512. Set in the content code portion 1511 is a content code which is previously set in a corresponding manner to data stored in the data portion 1512 to indicate the contents of the data. Each of the processor 3udges on the basis of the content code set in the content code portion 1511 whether the processor requires the message or not.

In the embodiment, the data transmitted by an application program "AP1" are broadcasted as a message, which is received by an application program "AP2" in the same processor 1501 as the application program "AP1", an application programs "AP3" and "AP4" in the processor 1502 and an application program "AP6" in the processor 1503 which require the message. Each of the processors judges on the basis of the content code given to the message 1510 whether the processor requires the message or not. When the processor requires the message, the processor receives the message and delivers the data in the message to the application program therein which requires the data.

Figure 12:
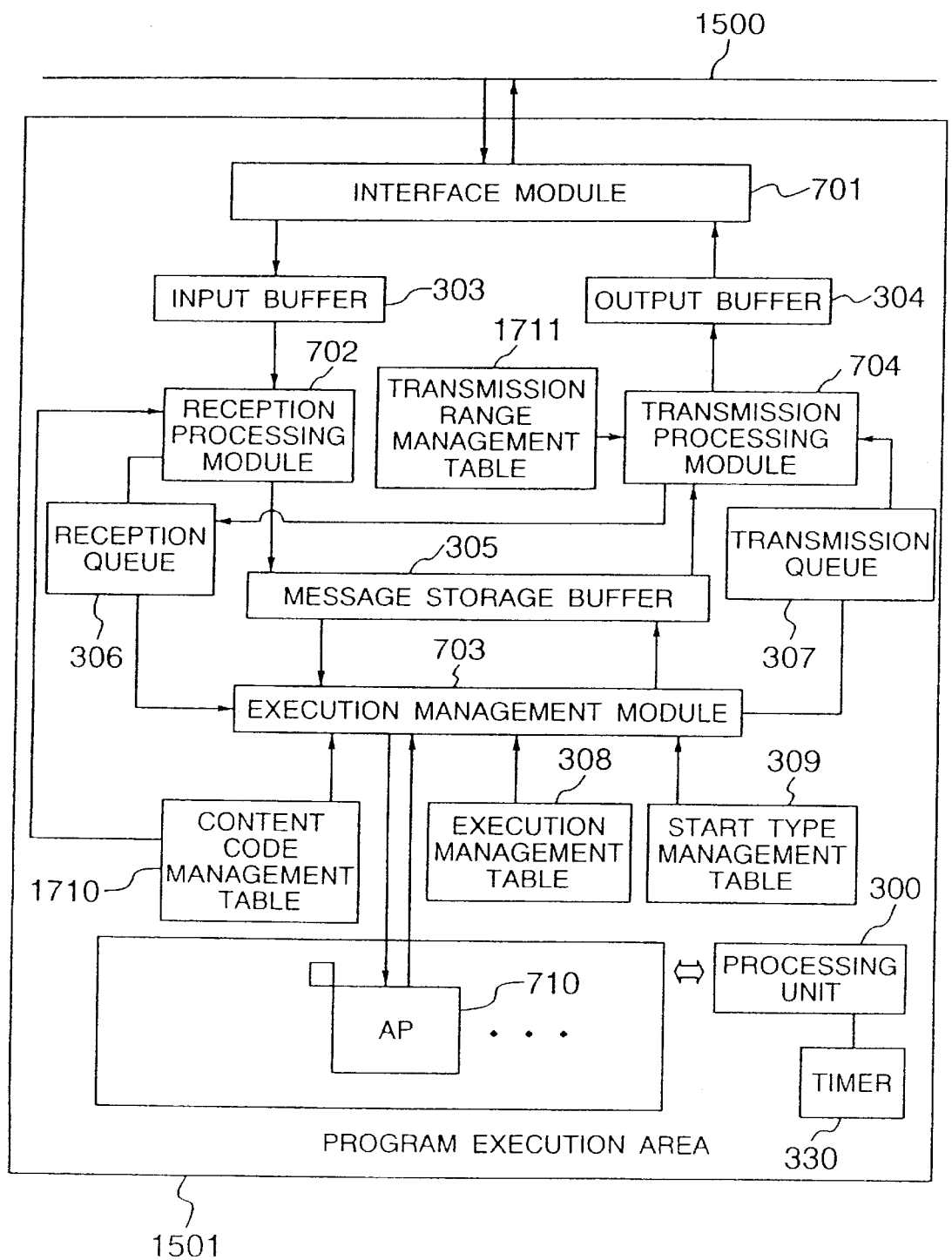
FIG. 12 is a functional block diagram of a processor in the embodiment 3.

As shown in FIG. 12, the processor 1501 has substantially the same configuration as that of the processor shown in FIG. 3 and the start type management table 309 has the same configuration as that of the embodiment 2 shown in FIG. 9. Further, a content code management table 1710 is substituted for the start condition management table 310 and a transmission range management table 1711 is substituted for the AP name management table 311.

FIG. 12 is a functional block diagram schematically illustrating the processor in the embodiment. The interface module 701 takes in a message on the network 1500 and stores the message into the input buffer 303. Further, when a message to be transmitted is stored in the output buffer 304, the message is transmitted onto the network 1500. The reception processing module 702 reads the message stored in the input buffer 303 and examines with reference to the content code management table 1710 whether the content code set in the content code portion 1511 of the message is registered or not. When it is registered, the message is stored in the message storage buffer. At this time, the storage location of the message is connected to the reception queue 306. The message size is stored in the message storage buffer 305 together with the message. Further, when the pertinent content code is not registered, the message is abandoned. The execution management module 703 reads the messages stored in the message storage buffer 305 in order of the received messages on the basis of the information indicative of the storage locations of the messages stored in the reception queue 306 and manages starting of the application program 710. More specifically, the execution management module 703 refers to the content code management table 1710 on the basis of the content code of the message read from the message storage buffer 305 and reads the start type number, the start parameter and the application program name defined to the content code. When the start type number indicates the start type relative to the start cancel, the execution management module 703 deletes the information relative to the application program name obtained with reference to the content code management table in the execution management table 308. When the start type is another type, the execution management module 703 sets information to the execution management table 308 on the basis of the obtained start type number, start parameter and application program and starts the pertinent application program 710. The application program 710, when started, receives necessary data from the execution management module 703 and performs the process, so that the resultant data are delivered to the execution management module 703 while designating the content code and the message size defined in accordance with the data. The execution management module 703 produces a message on the basis of the received information and stores the message into the message storage buffer 305. A storage location thereof is registered in the transmission queue 307. The transmission processing module reads the messages stored in the message storage buffer 305 by the execution management module 703 in order. When the transmission processing module understands with reference to the transmission range management table 1711 that the transmission range of the message is within the processor to which the module belongs, the storage location of the message is registered in the reception queue 306, and otherwise the message is stored in the output buffer 304 and the message in the message storage buffer 305 is deleted.

FIG. 13 shows a configuration of the content code management table 1710. The content code given to the message received by the processor is registered in each entry of column 1801. A name of an application program requiring data of the message given the content code is registered in column 1802 in a corresponding manner to the content code registered in column 1801. The start type number indicating the start type of data of the message given the content code registered in column 1801 is registered in column 1803. Information relative to the start parameter is registered in column 1804. The processor manages starting of the application program on the basis of the information in the content code management table. For example, in accordance with the definition of row 1805 in a definition example shown in FIG. 13, when the processor receives the message given the content code "CC1", the processor starts the application programs "A1", "A2" and "B2" with the start type number "1" and the start parameter "10", that is, the period-of-time of 10 msec. Further, in accordance with the definition of row 1806, when the processor receives the message given the content code "CC3", the processor starts the application programs "B1" and "C5" with the start type number "2" and the start parameter "50", that is, the period-of-time of 50 msec.

The configuration of the transmission range management table 1711 is shown in FIG. 14. The transmission range management table 1711 includes information for defining a range in which a message is transmitted for each content code given the message. In FIG. 14, the content code corresponding to data produced by the application program in the processor is registered in each entry of column 1901. Information relative to the transmission range defined for the message given the content code registered in corresponding entry of column 1901 is preserved in each entry of column 1902. The processor designates the range in which the message is broadcasted on the basis of the information of the transmission range management table upon transmission of the message. As the range in which the message is broadcasted, for example, two ranges including one being within its own processor and the other covering the whole processors including its—own processor can be designated.

Figure 15:
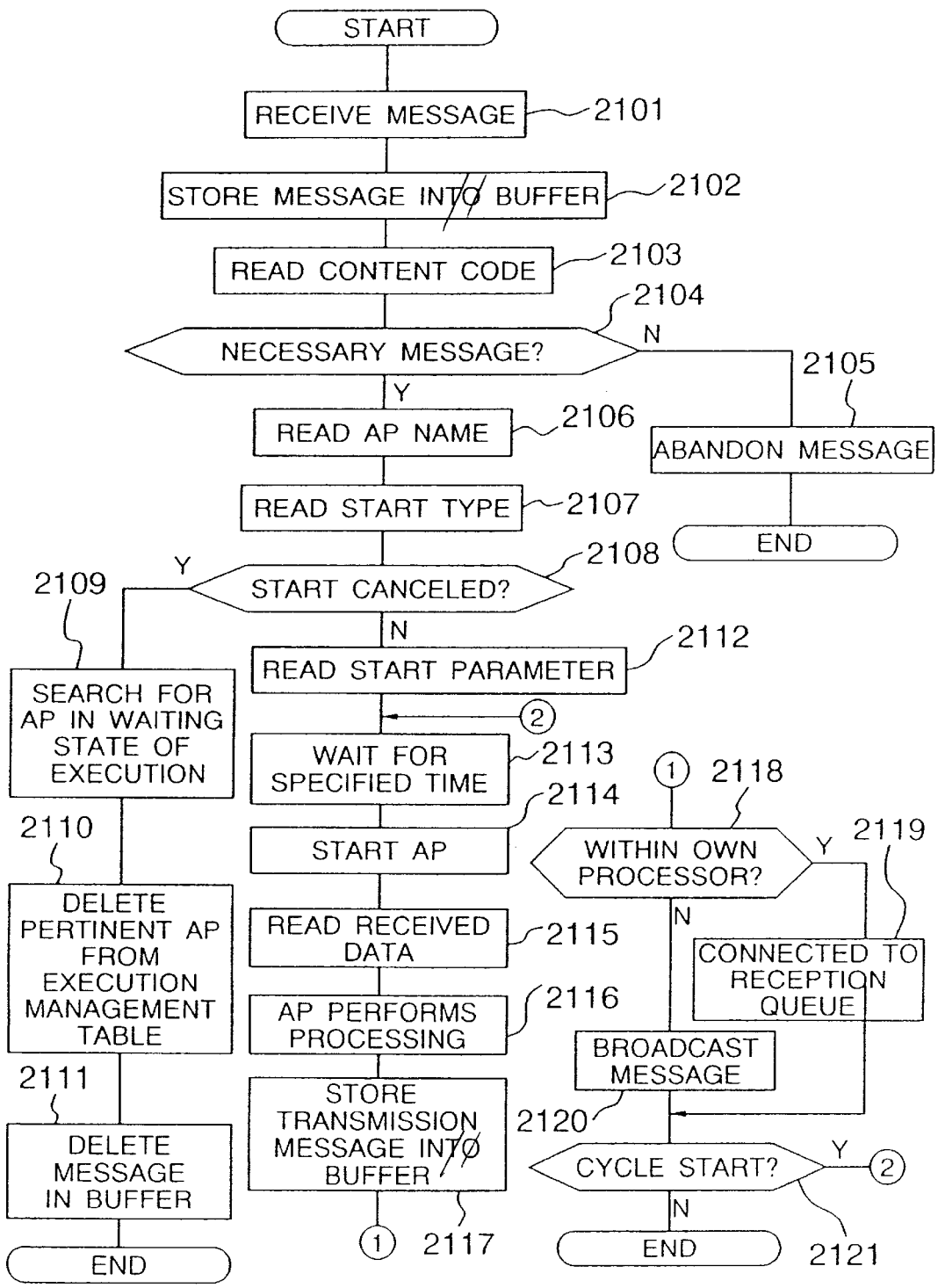
FIG. 15 is a flow chart of processing performed by the processor in the embodiment 3.

FIG. 15 is a flow chart showing the processing performed by the processor. First of all, when the processor receives a message on the network 1500 through the interface module 701 (step 2101), the message is stored in the message storage buffer 305 (step 2102). The message stored in the input buffer 303 is read by the reception processing module and the content code set in the content code portion 1511 of the message is read (step 2103). Whether the same content code is registered in the content code management table 1710 or not is retrieved and it is judged whether the message is necessary or not (step 2104). When not registered, the received message is not necessary and accordingly the message is abandoned to finish the process (step 2105). When the pertinent content code is registered, the application program name and the start type number defined for the content code are read from the content code management table 1710 (steps 2106 and 2107). When the start type number indicates any of the period-of-time start cancel, the cycle start cancel and the point-of-time start cancel (step 2108), the execution management table 308 is searched for the same application program name as the read application program name (step 2109). When the start type set in correspondence to the application program name is identical, the information is deleted from the execution management table 308 and execution is canceled (step 2110). The message to be read in the application program is deleted from the message storage buffer 305 (step 2111).

On the other hand, in step 2108, when the start type number indicates any of the period-of-time start, the cycle start and the point-of-time start, the start parameter defined for the content code is read from the content code management table 1710 (step 2112). The pertinent application program is started in accordance with the specified time defined as the start parameter (steps 2113 and 2114). When there is a reception request of data from the started application program, the execution management module 703 reads the data in the message and copies the data into the area specified by the application program to deliver the data to the application program (step 2115). The application program performs processing using the data (step-2116). When the processing is completed, the transmission request is issued and the content code and the transmission data are stored in the message storage buffer 305 (step 2117).

The execution management module 703 searches the transmission range management table 1711 for the content code designated by the application program and examines whether the transmission range indicates the inside of its own processor or not (step 2118). When the transmission range indicates the inside of its own processor, the message storage location is connected to the reception queue 306 (step 2119). When the transmission range indicates the whole processors, the message is broadcasted onto the network (step 2120). It is then examined whether the application program which has completed the processing is the cycle start or not (step 2121). When it is the cycle start, the time taken until the next start is set in the execution management table 308 and the process is repeated.

In the embodiment 3, the operator defines the start type and the start parameter for the content code. Further, when the application program sets the wrong content code to the data and transmits the message, the content codes capable of being inputted to the application programs are previously defined in order to prevent the whole system from being affected adversely.

Figure 16:
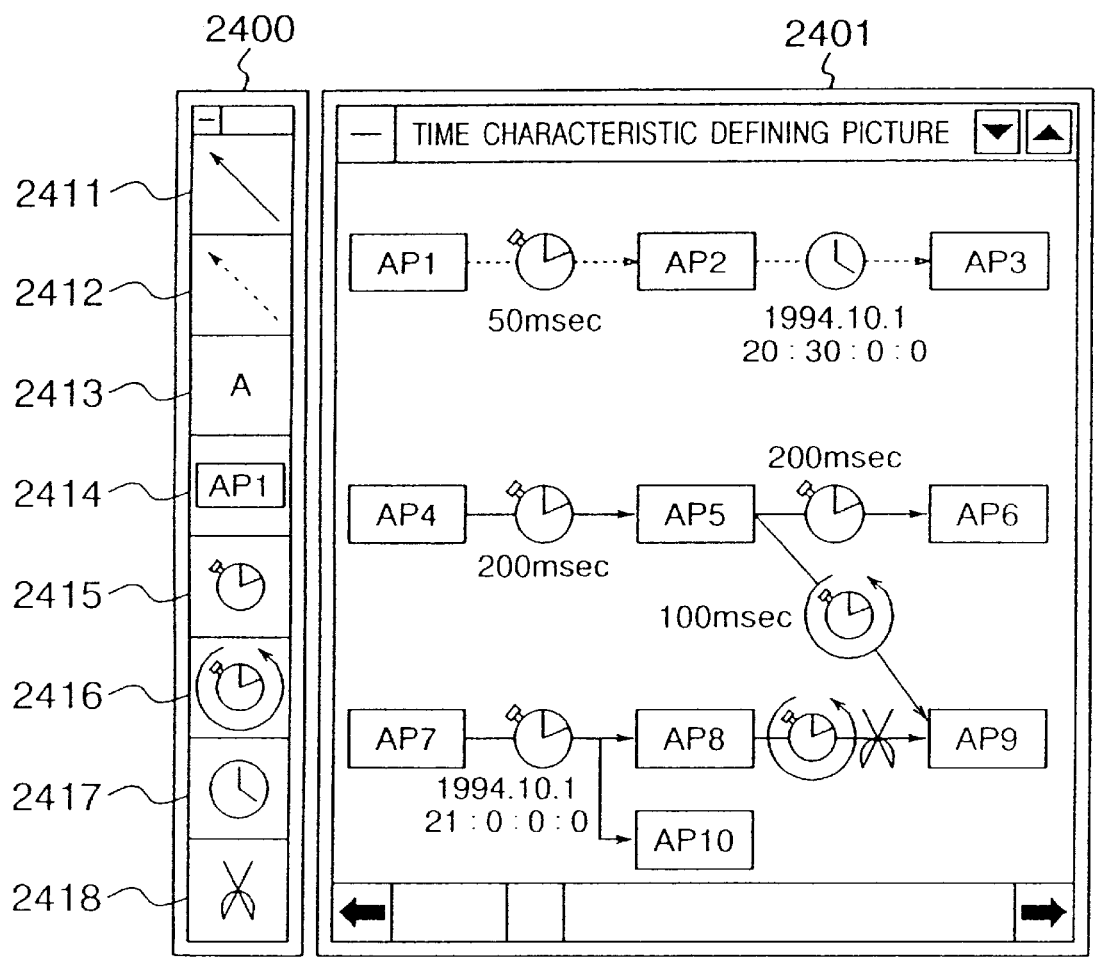
FIGS. 16 and 17 show configuration of definition screens used to define necessary information in the embodiment 3.

FIG. 16 shows a configuration example of a definition screen used to define necessary information. A picture 2400 displays tools and icons used by the operator and a picture 2401 represents a time characteristic defining picture for defining the time characteristic.

Tools 2411 and 2412 represented by arrows in the picture 2400 are linkage tools used to define a linkage between application programs. The linkage means delivery and receipt of data between application—programs. The linkage tool 2411 is a tool used to define delivery and receipt between two application programs of data broadcasted to the outside of the processor. The linkage tool 2412 is a tool used to define delivery and receipt between two application programs of data having the transmission range indicating the inside of its own processor. Icon 2413 represents a character tool used to designate inputting of a character on the time characteristic defining picture 2401. The character tool 2413 is used to input an application program name and designate time information. An icon 2414 is used to define an application program on the time characteristic defining picture 2401. Icons 2415, 2416 and 2417 are used to define a start pattern on he time characteristic defining picture 2401 and are used to define the period-of-time start, the cycle start and the point-of-time start, respectively. Icon 2418 is used to define the period-of-time start cancel, the cycle start cancel and the point-of-time start cancel on the time characteristic defining picture 2401, respectively. The operation procedure for definition is as follows. First, the operator uses the mouse to move the cursor and clicks the icon 2414 to select it. When the icon 2414 is dragged to move it onto the time characteristic defining picture 2401, an application program can be defined.

When the application program is defined normally, a box indicating the application program is displayed on the time characteristic defining picture 2401. The character tool 2413 is then used to define a name of the application program. More specifically, after the character tool 2413 is selected, the previously defined box for the application program is clicked to select it and the name of the application program is inputted on the selected box. The inputted application program name is displayed in the box indicating the application program. Definition of a linkage between application programs is made by selecting the linkage tool 2411 or 2412 and clicking boxes defining the application programs which perform delivery and receipt of a message by means of the mouse in order of the application program transmitting the message and the application program receiving the message, for example. When the linkage tool 2411 is selected, the linkage between the application programs is displayed by arrow of solid line indicating a flow of data and when the linkage tool 2412 is used, it is displayed by arrow of broken line. Setting of the start type is made by selecting and dragging a desired one of the icons 2415, 2416, 2417 and 2418 and moving the selected icon onto the arrow between the application programs to which the start type is defined. The character tool is used to set the start parameter. The content code given to the message which is delivered and received between the application programs is automatically determined by the system in accordance with a predetermined rule and accordingly the operator is not required to consider it. For example, when the linkage between the application programs is defined, the content code is determined in order of definition in a corresponding manner to the arrow indicating the defined linkage. The definition is performed as described above to thereby define the linkage between the application programs, the start type and the start parameter as shown in the time characteristic defining picture 2401 of FIG. 16.

Figure 17:
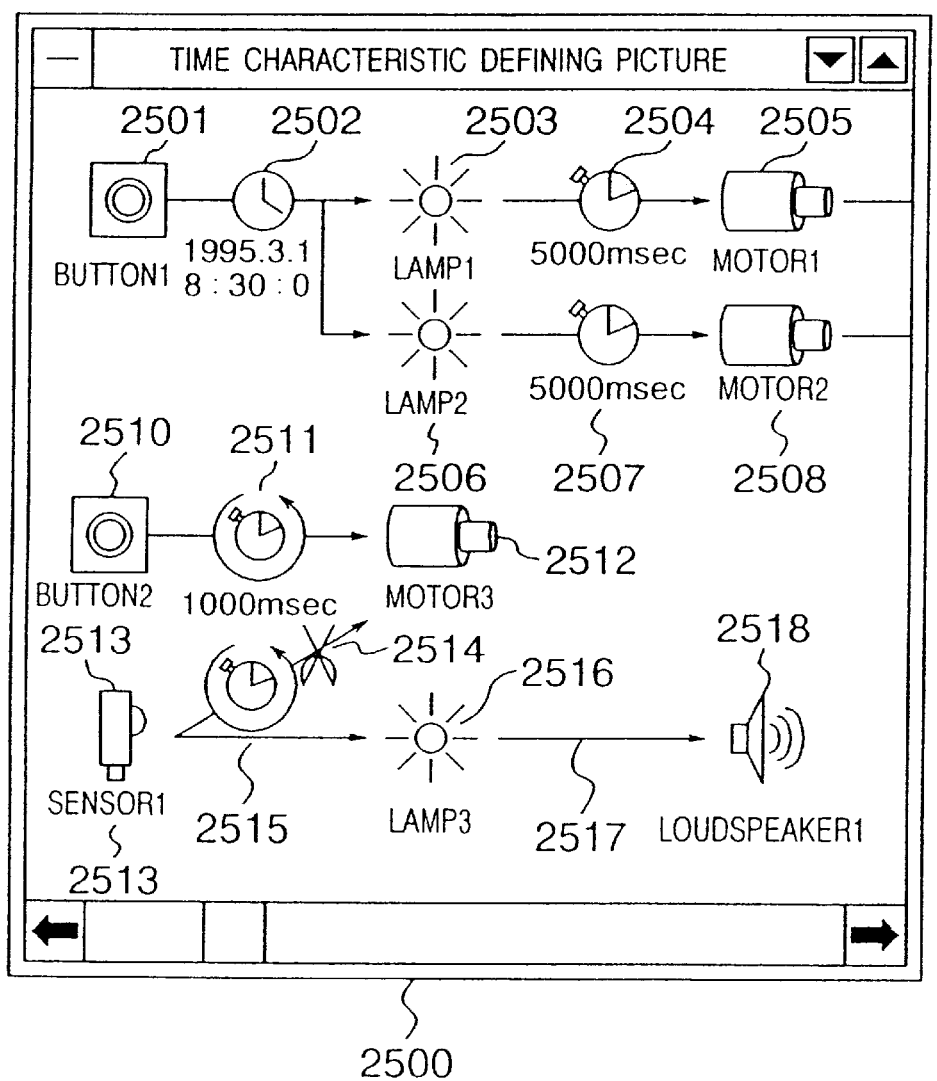

When the number of application programs capable of being loaded to one processor is limited to one, the linkage between the application programs shown in FIG. 16, for example, can be substituted by a linkage between nodes. As an example, in the system constituted by nodes which perform only simple process as an intelligent I/O device, there is no problem even if the constraint that only one application program is loaded to the processor in the node is provided. FIG. 17 shows the time characteristic setting picture 2500 in case where the constraint that only one application program can be loaded to one processor is provided. Buttons, motors, lamps, sensors and the like are provided as icons and nodes are defined by the same operation method as the icon 2414 for definition of the application program of FIG. 16.

The definition example of FIG. 17 is now described on the assumption that a proper application program is processed. When the "button 1" (2501) is depressed, a message 2502 is transmitted. "Lamp 1" (2503) and "lamp 2" (2504) which have received the message 2502 are lighted on at 8 o'clock 30 minute on May 1st in 1995 and the "lamp 1" (2503) transmits a message 2504 and the "lamp 2" (2506) transmits a message 2507. A "motor 1" (2505) receives the message 2504 and is rotated after an elapse of 5 seconds. A "motor 2" (2508) receives the message 2507 and is rotated after an elapse of 5 seconds. The "lamp 1" and the "lamp 2" are lamps for notifying that the motors are rotated. Thus, it can be defined that the motor does not start its rotation immediately after depressing the button and the motor is rotated after previously notifying by means of the alarm lamp for avoidance of danger that the motor starts its rotation. Further, when the "button 2" (2510) is depressed, a message 2511 is broadcasted and a "motor 3" (2512) receives the message. When the "motor 31" receives the message, the "motor 3" is moved or rotated at a period of one second. A "sensor 1" (2513) is to detect an object and when the "sensor 1" detects an object, the "sensor 11' broadcast messages 2514 and 2515. When the "motor 3" (2512) receives the message 2514, the "motor 3" stops its rotation. When a "lamp 3" receives the message 2515, the "lamp 31, is lighted on immediately and broadcasts a message 2517. When a "loudspeaker 11, (2518) receives the message 2517, the "loudspeaker 11, produces sound immediately. The "sensor 1" (2513) is an alarm detection sensor of the 'motor 3" (2512), the "lamp 3" is an alarm lamp for notifying abnormality, and the "loudspeaker 1" (2518) is a loudspeaker for producing beep or voice in order to notify abnormality. Thus, it can be defined that when the "sensor 1" detects that a man approaches the motor during rotation of the "motor 3", the motor is stopped and the "lamp 3" and the "loudspeaker 1" produce an alarm.

The definition picture shown in FIG. 17 is a picture for defining the start type and the start parameter for the linkage between nodes and the data and at the same time can also attain the programming function. In other words, when simple processes such as the button, the motor, the sensor and the like are prepared as a library and are provided in the form of icons to the operator, it is not necessary to make programming as in the prior art and the system can be structured by the programming system which performs definition of the application programs by arranging of icons on the picture of the tools, definition of the linkages between the application programs by connecting between the icons by lines, definition of time information relative to start with respect to the lines between the icons and display of the time information defined on the lines connecting between the icons.

Figure 33:
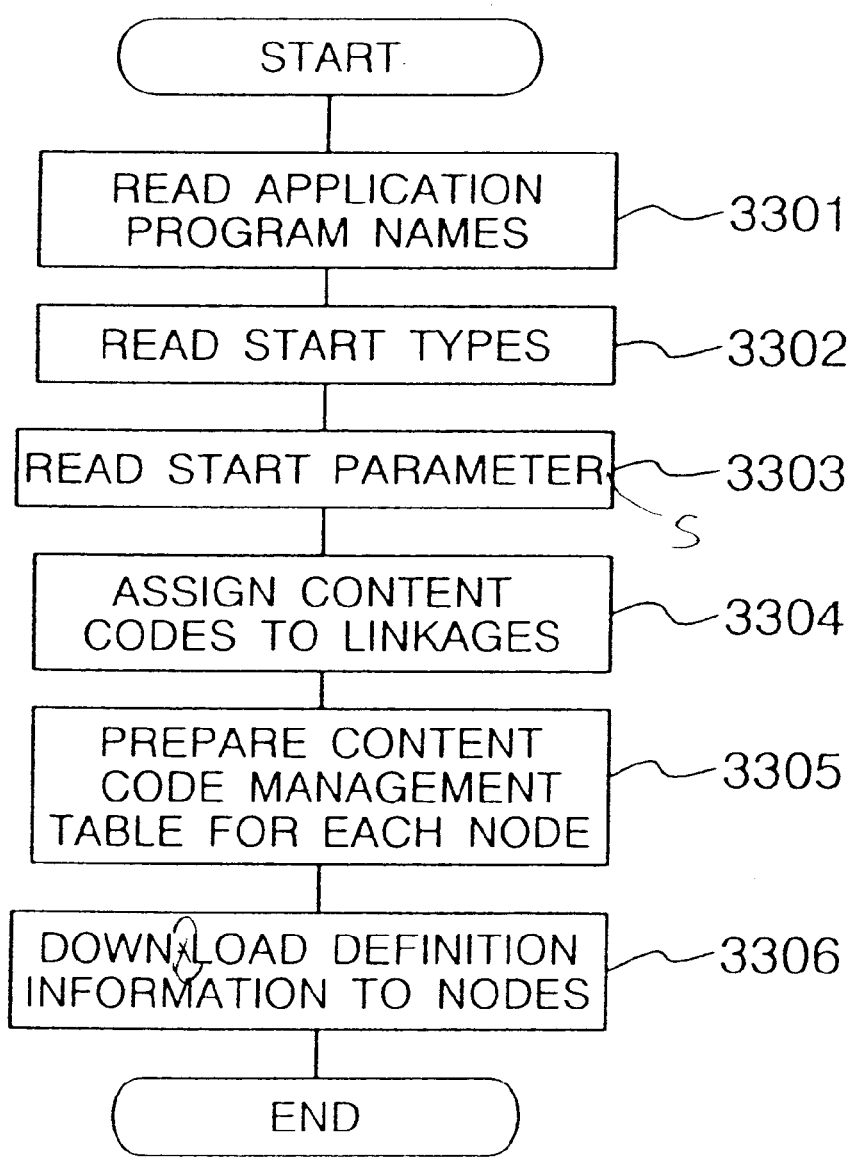
FIG. 33 is a flow chart showing processing performed by tools constituting a system of FIG. 17; 5

FIG. 33 is a flow chart showing processing performed by tools structuring the system. In the tools, all of names of nodes, that is, application programs defined on the definition picture 2500 shown in FIG. 17 are read (step 3301). Since only one application program is loaded in one node having one processor, the node names and the application program names may be treated to be identical. Then, the start types and start parameters defined to the linkages between the nodes on the definition picture 2500 are read (steps 3302 and

3303). Content codes are assigned to the linkages connecting between the application programs, that is, data flowing between the application programs (step 3304). For example, numbers are given to each of the linkages successively from the linkage at the upper left portion on the definition picture 2500. The content code management table is prepared for each node on the basis of the application program names, the content codes, the start types and the start parameters obtained above (step 3305). For example, the content code management table of the lamp 1 is prepared as shown in FIG. 34A. The content code CC1 (3401) is automatically given by the tools. When the lamp 1 (3402) which is an application program receives the content code CC1 (3401), the lamp 1 is started or lighted at 8 o'clock 30 minute on March 1st in 1995 (3404) by the point-of-time start (3403).

In the above description, there is provided the limitation that one application program is loaded in one node, while even when a plurality of application programs are loaded in one node, the same system can be used. For example, when the lamps 1 and 2 which are application programs are loaded in the same node, that is, the same processor, the content code management table of the processor is prepared as shown in FIG. 34B. The same definition information as in FIG. 34A is registered to the lamp 1 (3410) and since the lamp 3 is the application program existing in the same processor, the lamp 3 is registered in the same content code management table. The lamp 3 receives CC8 (3421) assigned automatically by the tools, while since the start type is not defined, the lamp 3 is started or lighted immediately.

As described above, in the tools for defining the flow of data among the plurality of programs distributed in the plurality of processing units connected through the network, the content code management table for each node prepared successively by defining the flow (linkages) of data among the application programs on the display screen by the user is loaded in each node (3306).

The definition pictures shown in FIGS. 16 and 17 are used to define the necessary time information upon structure of the system and are also used when the system is required to be corrected. In this case, the information defined upon structure of the system is added or corrected on the same picture and the defined information is down-loaded to the processors again. [Embodiment 4)

According to the embodiment 3, the message is broadcasted within its own processor or to the whole processors in the system and only the application program requiring the message receives the message. The application program requiring the message is not started only one time immediately and is started in accordance with the predetermined time condition after reception of the message. Accordingly, it is easy to start a plurality of application programs at the same time and to operate a plurality of application programs in cooperation with each other while keeping the timing among them, so that the burden of persons engaged in development upon structure of the system is reduced. Further, since the interface for the application programs is unified by the content code, developers of programs can be devoted to development of the programs concerning individual processes to thereby improve the efficiency of programming. In addition, since data exchange between the application programs and definition of the start timing are easy, the burden for defining the data exchange between the application programs and the data definition can be reduced greatly. Thus, the labor necessary for correction and modification of the system and the development efficiency of the system is reduced greatly as compared with the conventional system structuring method.

In the embodiment 3, when the processor receives the message, the application program is started in accordance with the previously set start type and start parameter. In this case, the message which the application program can receive is limited to one. However, there may be a plurality of messages required by the application program. In this case, when all of messages required by the application program are present, the processor starts the application program in accordance with the previously set start type and start parameter and data in all of the messages required to the started application program can read. The embodiment 4 according to such a system is now described.

In the embodiment, the processors are structured in substantially the same manner as the embodiment 3. The processor of the embodiment 4 is different from that of the embodiment 3 in that the start management method of the application program by the execution management module and the reception message management table to which reference is made when the execution management module judges whether all of necessary messages are present or not are added.

FIG. 18 shows a configuration of the reception message management table. In the reception message management table, an application program name is set in each entry of column 2701. The content code of the message required by the application program and the priority are set in columns 2702 and 2703 in a corresponding manner to the application program set in column 2701. A flag is set in column 2704 when the message given the content code set in the column 2702 is received. A message storage location in the message storage buffer is set in column 2705. When a message is received, a reception flag 2704 is set in column 2704 and the message storage location 2705 is established. The priority set in column 2703 is used to determine the start condition. For example, it is assumed that the start type of the application program based on reception of the message having the content code. "CC3" is the period-of-time start of 15000 msec and the start type of the application program based on reception of the message having the content code "CC1, is the period-of-time start of 55000 msec. When it is assumed that the priority of "CC3" is higher as shown in FIG. 18, the application program is started 15000 msec after reception of the message having the content code "CC3" even if the message having the content code "CC1" is received 2000 msec after reception of the message having the content code "CC3". Conversely, when it is assumed that the priority of "CC1" is higher, the application program is started 55000 msec after reception of the message having the content code "CC1". When the priority is not defined or is not used, the content code having the first started start type and start parameter has the highest priority. Further, when the cycle start is defined as the start type having the content code of the highest priority, the cycle start is performed.

Figure 19:
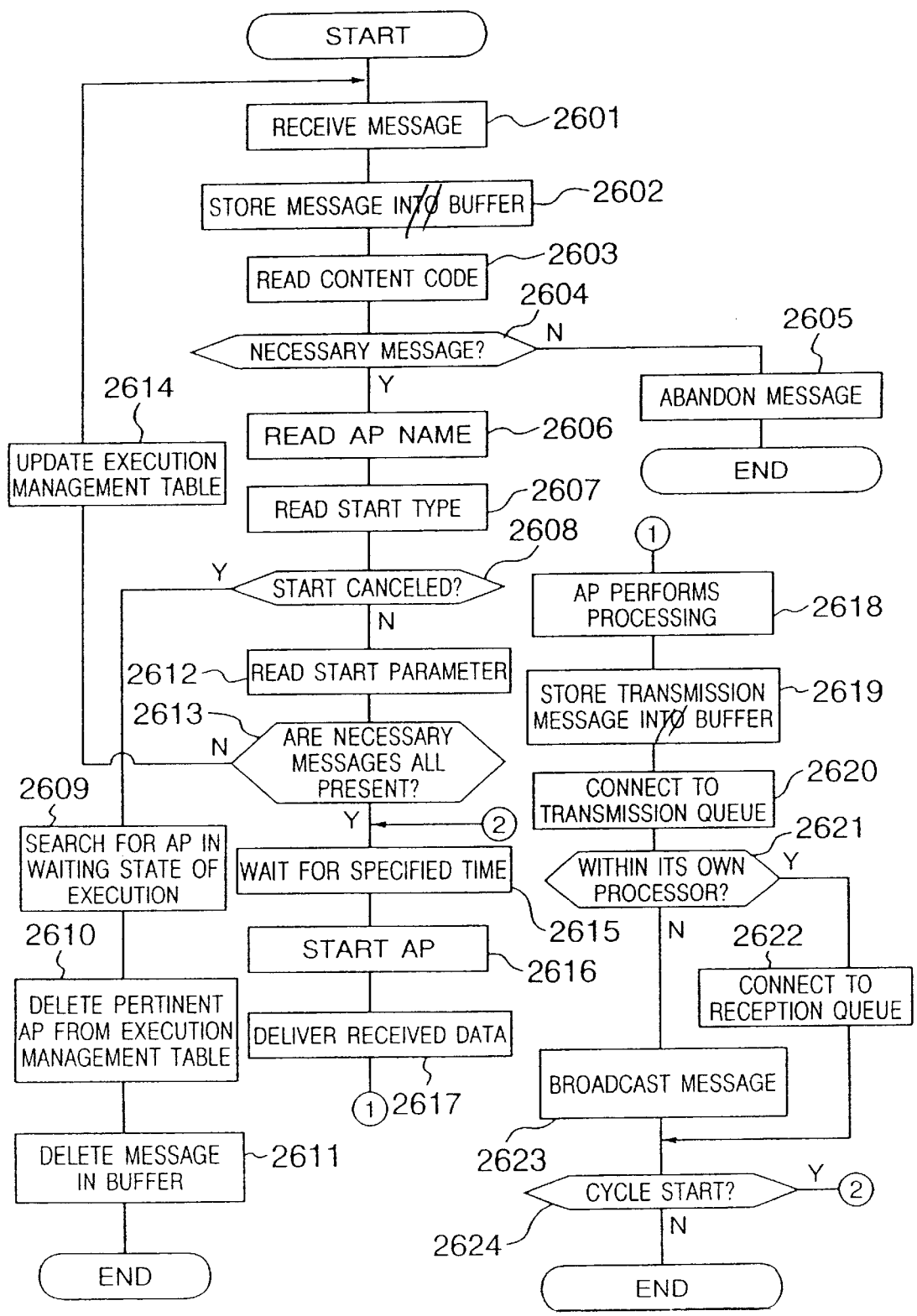
FIG. 19 is a flow chart showing processing in the embodiment 4.

FIG. 19 is a flow chart showing processing of the embodiment. Since the processes made in steps 2601 to 2612 of FIG. 19 correspond to the processes made in steps 2101 to 2112 of FIG. 15 and are performed similarly, description thereof is omitted. In this embodiment, subsequently to step 2612, whether the messages required by the application program are all present or not is judged with reference to the reception message management table (step 2613). In step 2613, before judgment as to whether the messages are all present or not, the storage location of the message received this time and the flag indicating that the message has been received are set in the reception message management table. When an old message given the same content code as the content code given to the message received this time and which is not used to process the application program is stored in the message storage buffer, that is, when a new message is received before the messages are all present, the old message is deleted from the message storage buffer. Information in the reception message management table is rewritten. When the necessary messages are not all present, the execution waiting time of the execution management table is updated on the basis of the priority of the content code, the start type and the start parameter of the received message (step 2614). The execution management table is examined periodically and when the messages required by the application program are not all present even if the waiting time for execution is reduced to 0, information relative to the application program in the execution management table is deleted and the application program is not started. On the other hand, when it is judged that the necessary messages are all present in step 2613, the application program is started (step 2616) after waiting until the execution time is reached in accordance with the start condition set in the execution management table (step 2615). The started application program issues the reception request to read all of necessary information (step 2617) and performs the processing by using data in the message (step 2618). The processed result by the application program is stored in the buffer as the transmission message (step 2619), and information indicating the message storage location is connected to the transmission queue (step 2620). when the inside of its own processor is defined as the transmission range for the content code of the message (step 2621), the message storage location is connected to the reception queue 1706 (step 2622). When the whole processors are defined as the transmission range of the message, the message is broadcasted onto the network (step 2623). When the application program performs the cycle start (step 2624), the processes subsequent to the waiting process of the execution time in step 2113 are repeated.

Figure 20:
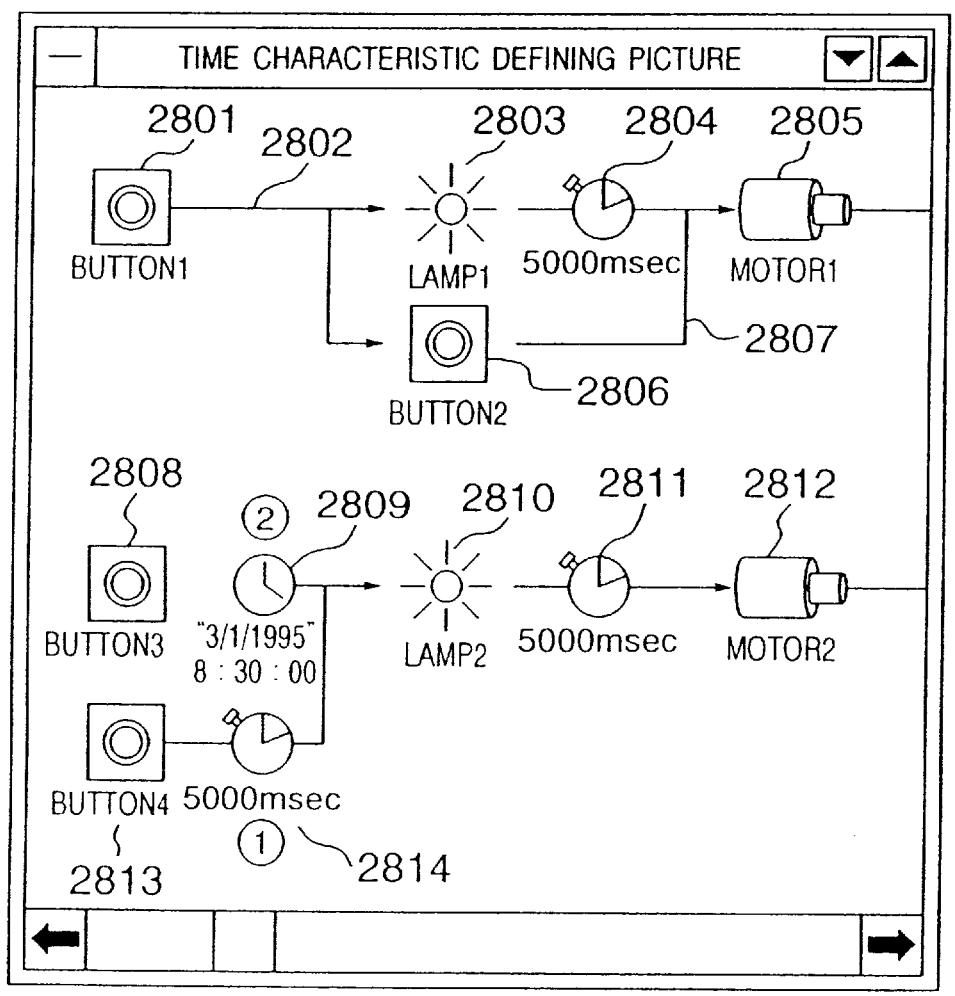
FIG. 20 shows an example of a time characteristic definition picture in the embodiment 4.

FIG. 20 shows an example of a time characteristic defining picture of the embodiment which is the same as that of FIG. 17. Accordingly, description for FIG. 16 is used for the definition procedure by the picture of FIG. 20. The process in the system of the embodiment is now described with reference to FIG. 20. When a "button 1" (2801) is depressed, a message 2802 is broadcasted by the "button 1" (2801). The message 2802 is received by a "lamp 1" (2803) and a "button 2" (2806). The "lamp 1" (2803) is lighted immediately after receiving the message 2802 and broadcasts a message 2804. Further, when the "button 21' (2806) is depressed after receiving the message 2802, the "button 21, broadcasts a message 2807. A "motor 1" (2805) receives the messages 2804 and 2807. When the "motor 1" (2805) receives the messages 2804 and 2807, the "motor 1" begins to be started in accordance with the start condition set in the content codes of the messages. In this example, the period-of-time start of 5000 msec is defined as the start type in the content code given to the message 2804 transmitted by the "lamp 1" (2803). Since the priority is not defined in the messages 2804 and 2807, the message started earlier has the priority. More particularly, when the "motor 111 (2805) receives the message 2807 within 5000 msec after reception of the message 2804, the "motor 1" is started immediately. Alternatively, when the "motor 1" receives the message 2807 first, the "motor 1" is started immediately after the 'motor 1" receives the message 2804. However, the "motor 1" (2805) is not started when the message 2804 is not received within 5000 msec after reception of the message 2804. Such a definition can be used, for example, when it is desired to set so that the "motor 1" (2805) does not begin to be rotated immediately after the "button 1" (2801) is depressed but the 'motor 1" (2805) begins to be rotated when the operator depresses the "button 2" (2806) within 5 seconds after lighting of the "lamp 1" (2803) for requiring confirmation of starting of rotation to the operator. When the application programs for realizing simple functions that the message is transmitted when the button is depressed, the lamp is lighted when the message is received and the motor begins to be rotated when the message is received are provided as a library, the series of operations as described above can be realized only by setting the time characteristic definition picture 2800 shown in FIG. 20.

Similarly, when a "button 3" (2808) is depressed, a message 2809 is broadcasted and when a "button 4" (2813) is depressed, a message 2814 is broadcasted. When a "lamp 2" (2810) receives the messages 2809 and 2814, the "lamp 21, is lighted in accordance with the time conditions defined to the content codes given to the messages. The point-of-time start for starting at 8 o'clock 30 minute on May 1st in 1995 is defined as the start type to the content code given to the message 2809 broadcasted by the "button 3" (2808) and the point-of-time start of 5000 msec is defined as the start type to the content code given to the message 2814 broadcasted by the "button 4" (2813). The priority (in FIG. 20, circled numerals define the priority) are set to the two messages and the start condition defined to the content code of the message 2814 has the priority. Accordingly, even when the message 2814 is received after reception of the message 2809, the "lamp 2" (2810) is lighted 5000 msec after reception of the message 2814 irrespective of the start time. After the "lamp 2" (2810) is lighted, a message 2811 is broadcasted. The message 2811 is received by a "motor 2" (2812) and the "motor 2" (2812) begins to be rotated immediately. In order to set the priority of the message, a tool for setting the priority is provided to thereby set the priority by inputting the numeral. In order to easily understand the priority among messages, for example, the thickness of arrows indicating the flow of the messages may be thickened when the priority is higher or the color of arrows may be deepened when the priority is higher or the color of arrows may be changed in accordance with the priority.

According to the embodiment 4, the message is broadcasted to the inside of its own processor or to the whole processors in the system and is received by only the application program requiring the message. When the application program receives all of necessary messages, the application program is started in accordance with the previously set start condition. Thus, one application program can be started while keeping the timing with a plurality of other application programs, so that the programming requiring complicated cooperative operation can be made easily. [Embodiment 5]

In the embodiments described above, one start type and start parameter are defined to one application program name or content code, while a plurality of start types and start parameters may be defined to one application program name or content code. At this time, defined information is registered in the start condition management table or the content code management table previously. FIGS. 21A and 21B show configuration of the start condition management table and the content code management table for defining a plurality of start types and start parameters to one application program name and one content code, respectively.

FIG. 21A shows a configuration of the start condition management table, in which a plurality of start types (columns 2902 and 2904) and start parameters (columns 2903 and 2905) are defined to one application program name set in column 2901. FIG. 21B shows a configuration of the content code management table, in which in respect to one content code set in column 2911, there is provided column 2912 for setting one or a plurality of application program names requiring a message given the content code and started by the message, a plurality of columns 2913 and 2915 for defining the start types and a plurality of columns 2914 and 2915 for defining the start parameters.

Figure 22A:
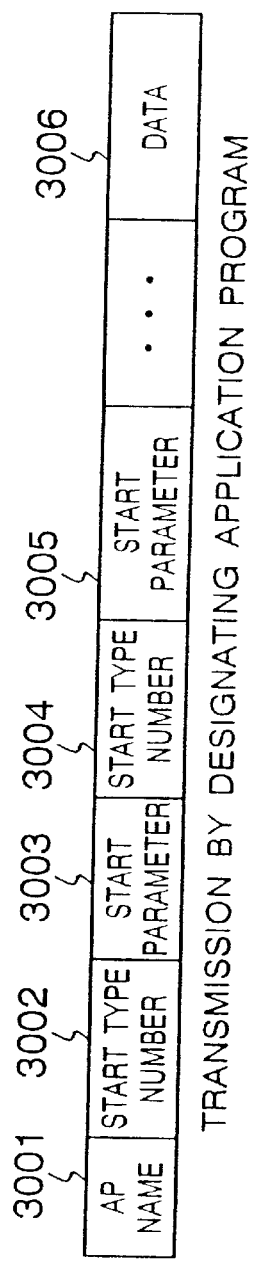
FIGS. 22A and 22B show formats of messages transmitted over a network in the embodiment 5.
Figure 22B:
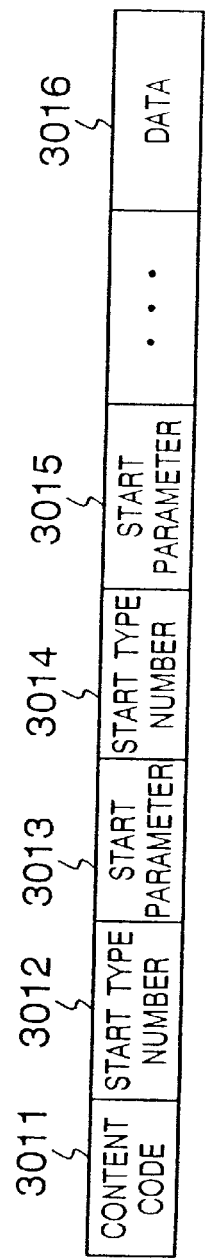

Further, the plurality of start types and start parameters may be given to the message and be transmitted together with the message. In this case, the message format in the case of the systems in which the destination-side application program is designated as in the embodiments 1 and 2 is shown in FIG. 22A. An application program name portion 301, a plurality of start number portions 3002 and start parameter portions 3003 are set in a corresponding manner to a data portion 3006. In the case of the communication by the content code shown in the embodiment 3, the message format is as shown in FIG. 22B. In this message, a content code portion 3011, a plurality of start type number portions 3012 and start parameter portions 3013 are set in a corresponding manner to a data portion 3016.

In the system in which the plurality of start types and start parameters are defined as described above, the waiting time for execution is not calculated from one start parameter but the start condition, that is, the waiting time for execution is calculated from the plurality of defined start types and start parameters and is set in the execution management table. In this system, the plurality of start types can contain the start type for canceling execution, that is, the period-of-time start cancel, the cycle start cancel and the point-of-time start cancel and management of time until cancel of execution can be made by the execution cancel management table as shown in FIG. 23. The execution cancel management table preserves an execution cancel waiting time (column 3101) taken to cancel execution of the period-of-time start, the cycle start and the point-of-time start, an application program name (column 3102) of an application program of which execution is canceled, and information relative to the start type number (column 3103). The start type number indicating any of the period-of-time start cancel, the cycle start cancel and the point-of-time start cancel is set in the start type number set in column 3103 in accordance with information indicating that any of the period-of-time start, the cycle start and the point-of-time start is canceled.

The method of setting the execution waiting time and the execution cancel waiting time in this system is now described while showing some examples in which the plurality of start type numbers and start types are defined by the message format shown in FIG. 22A. In an example 1 shown in FIG. 24B, a time start (3212) of 5000 msec and the cycle start (3213) of 20 msec are set for an application program "AP1" (3211). The processor which has received this message starts the application program "AP1" after 5000 msec and then starts the application program "AP1" periodically every 20 msec. The execution management table at this time is set as shown in FIG. 25A. That is, for the application program "API, the start condition relative to the period-of-time start is set in row 3311 and the start condition relative to the cycle start is set in row 3312. This execution management table is configured in the same manner as that of the first embodiment described in FIG. 7. 5000 msec and 5020 msec are set as the execution waiting time. The execution waiting time 5020 msec set in row 3312 represents the time until the second and subsequent starts after the application program "AP1" is started by the period-of-time start. This time is calculated by adding the waiting time until execution of the period-of-time start to the start period of the cycle start.

In an example 2 shown in FIG. 24C, for an application program "AP2" (3221), the point-of-time start (3222) at 10 o'clock 30 minute 30 second on March 23rd in 2000 and the cycle start (3213) of 50 msec are set. The processor which has received this message starts the application program "AP2" at a period of 50 msec from 10 o'clock 30 minute 30 second on March $23^{rd}$ in 2000.

In an example 3 shown in FIG. 24D, for an application program "AP3" (3231), a period-of-time start (3232) of 8000 msec and a cycle start cancel (3233) are set. The processor which has received this message cancels the cycle start of the application program "AP3" after 8000 msec or 8 seconds. In this case, the execution cancel management table is set as shown in FIG. 25B. 6000 msec is set as the execution cancel waiting time, the "AP3" is set as the application program name, and "5" indicating the cycle start cancel is set as the start type number (row 3321). The cycle start cancel to the application program "AP3" is executed after 8000 msec in accordance with the execution cancel management table.

In an example 4 shown in FIG. 24E, for an application program "AP4" (3241), a period-of-time start (3242) of 3000 msec and a point-of-time start (3243) at 20 o'clock 0 minute 0 second on May 1st in 2001 are set. The processor which has received this message starts the application program "AP4" once after 3000 msec and starts it once more at 10 o'clock 30 minute 30 second on March 23rd in 2000.

In an example 5 shown in FIG. 24F, for an application program "AP5" (3251), a period-of-time start (3252) of 1000 msec, a cycle start (3253) of 100 msec, a period-of-time start (3254) of 5000 msec and a cycle start cancel (3255) are set. The processor which has received the message starts the application program "AP5" after 1000 msec and then starts it periodically every 100 msec. Further, the processor cancels the cycle start 5000 msec after reception of the message. In this case, the execution management table and the execution cancel management table are set as shown in FIGS. 25C and 25D. "AP5" and 1000 msec are set in the execution management table as the application program name and the execution waiting time, respectively. Since the start type is the cycle start, 100 msec is set as the start period from the start parameter (row 2241). The application program "AP5" is first started after 1000 msec and thereafter started every 100 msec. Then, set in the execution cancel management table are 5000 msec as the execution cancel waiting time, "AP5" as the application program name and "5" indicative of the cycle start cancel as the start type number.

In the embodiment 5, the plurality of start types and start parameters are defined for the application program or the content code. When each processor receives the message, the processor judges the start time on the basis of the plurality of start conditions and starts the application program at a proper time once or plural times. Heretofore, when such complicated start of the application program is to be made, the programmer is required to make a complicated program. In the embodiment 5, however, it is merely required to set the start type and the start parameter and it is not necessary to make a complicated programming at all. Accordingly, the efficiency of programming is improved greatly. Further, since processing of the application program and the starting of the application program can be designed separately, the design efficiency of the system is improved and the start timing can be changed easily. In other words, the efficiency of the design and the maintenance of the system is improved greatly.

[Embodiment 6]

Figure 26:
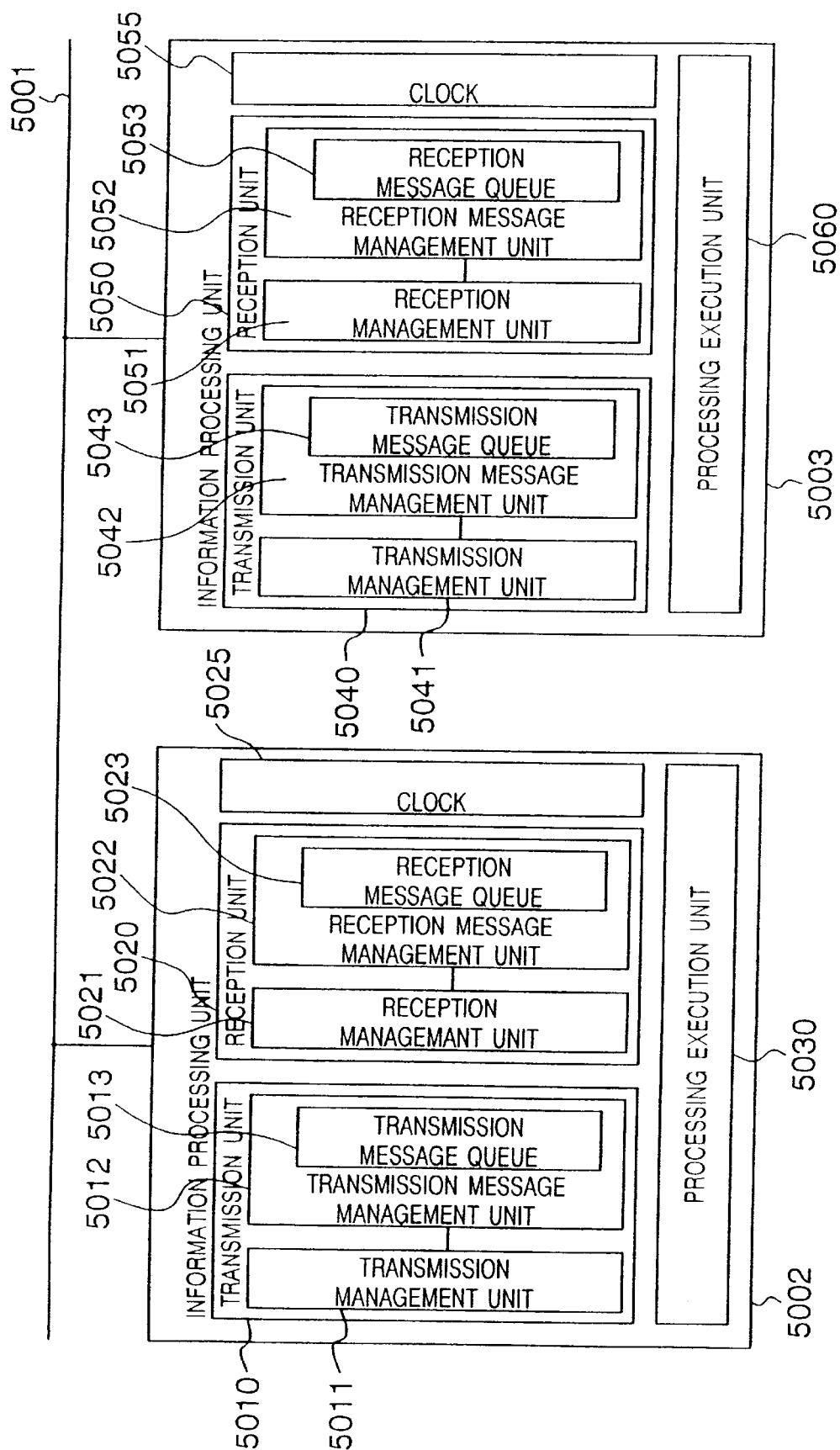
FIG. 26 is a schematic diagram illustrating an information processing system including a plurality of information processing units connected to one another through a network in an embodiment 6.

FIG. 26 is a schematic diagram illustrating an information processing system including a plurality of information processing units connected to one another through a communication medium (network) in accordance with an embodiment 6.

In FIG. 26, numeral 5001 denotes a communication medium (network), and 5002 and 5003 denotes information processing units. Each of the information processing units 5002 and 5003 is connected to the communication medium and communicates with another information processing unit through the communication medium 5001. The communication medium 5001 may use a communication line such as LAN, WAN and wireless. The information processing unit 5002 includes a transmission unit 5010, a reception unit 5020 and a processing execution unit 5030. Further, the information processing unit 5002 includes a clock 5025 for managing time. The clock 5025 may use an internal clock included in a computer or any virtual clock prepared by the user.

Furthermore, the information processing unit 5003 has the same configuration as that of the information processing unit 5002 and a transmission unit 5040, a reception unit 5050, a clock 5055 and a processing execution unit 5060 in the information processing unit 5003 have the same function as that of the transmission 5010, the reception unit 5020, the clock 5025 and the processing execution unit 5030 in the information processing unit 5002, respectively.

The transmission unit 5010 includes a transmission management unit 5011 which receives a message transmission request from the processing execution unit 5030 of its own information processing unit and manages transmission of the message and a transmission message management unit 5012 for controlling retransmission of the message. The transmission message management unit 5012 includes a transmission message queue 5013 for temporarily storing a retransmission message. Only one transmission management unit 5011 and transmission message management unit 5012 are shown in FIG. 26 but a plurality of transmission units and transmission message management units may be provided. Further, one transmission message management unit 5012 may include a plurality of transmission message queue 5013.

The reception unit 5020 includes a reception management unit 5021 for receiving the message to the processing execution unit 5030 of its own information processing unit and a reception message management unit 5022 for controlling transmission of the message to the processing execution unit 5030 of its own information processing unit. The reception message management unit 5022 includes a reception message queue for temporarily storing the reception message. Only one reception management unit 5021 and reception message management unit 5022 are shown in FIG. 26 but a plurality of reception management units and reception message management units may be provided. Further, one reception message management unit 5022 may include a plurality of reception message queue 5023.

The transmission message queue 5013 or the reception message queue 5023 may be provided in a memory of the information processing unit or in an external storage unit such as a hard disk and a magnetic tape managed by the information processing unit.

The clock 5025 is used by the information processing unit to manage time. One information processing unit may include a plurality of clocks. Time having a unit such as year, month, day, hour, minute and second can be obtained from the clock. Time indicated by the clock may be current time or virtual time set by the user.

The processing execution unit 5030 executes user programs and application programs prepared or utilized by the user, for example. The processing execution unit 30 transmits the executed result or a reference request of information necessary for processing to another information processing unit if necessary.

Figure 27:
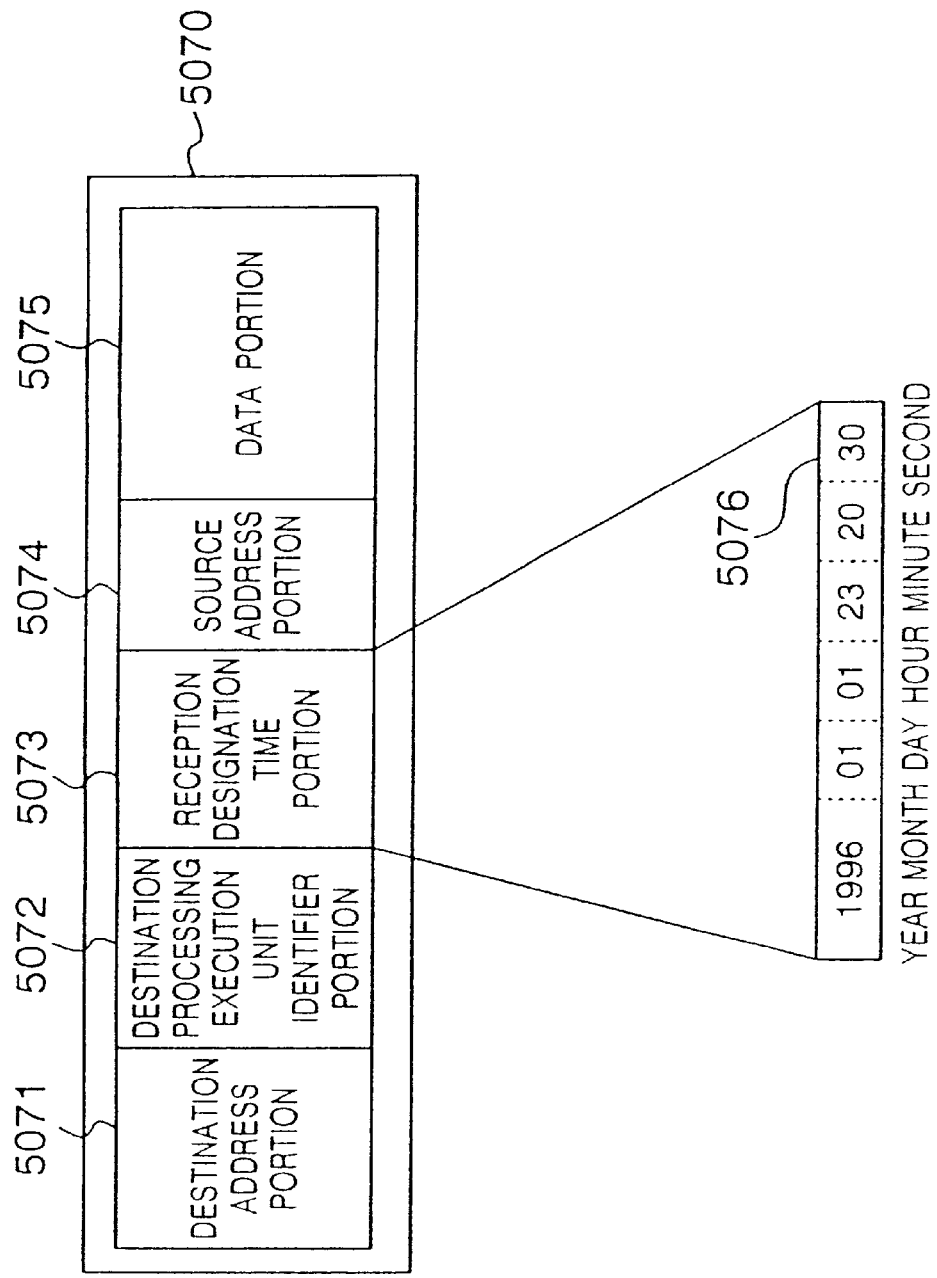
FIG. 27 shows an example of a format of a message transmitted through a communication medium 5001 of FIG. 26.

FIG. 27 shows an example of a format of a message transmitted through the communication medium 5001. As shown in FIG. 27, the message 5070 includes a destination address portion 5071 for preserving an address of a destination-side information processing unit to which the message is to be transmitted and a reception unit in the destination-side information processing unit as control information, a destination-side processing execution unit identifier portion 5072 for preserving an identifier for identifying a destination-side processing execution unit, a reception designation time portion 5073 for preserving time when the message is delivered to the destination-side processing execution unit, and a source address portion 5074 for preserving an identifier of a source-side processing execution unit and addresses of the transmission unit and a source-side information processing unit of the message as well as a data portion 5075 for preserving data transmitted between the processing execution units 5030 and 5060 of the information processing units through the communication medium 5001.

The message 5070 further includes information used to detect error occurring during communication, while the information is omitted since it is not directly related to the present invention. Numeral 5076 represents an example of a format of the transmission designation time portion 5073. The transmission designation time portion 5073 indicates the time that the message 5070 is delivered to the processing execution unit on the reception side (destination-side processing execution unit) and designates that the message 5070 is delivered to the destination-side processing execution unit at 23 o'clock 20 minute 30 second on January 1st in 1996. In this example, the time portion 5076 designates year, month, day, hour, minute and second, while the format thereof is not limited thereto and can be modified variously without departing from its gist.

In the embodiment 6, there is described the transmission and reception processing of the message from the processing execution unit 5030 of the source-side information processing unit 5002 (on the transmission side) to the processing execution unit 5060 of the destination-side information processing unit 5003 (on the reception side), while transmission from another information processing unit and another processing execution unit or transmission to another information processing unit and another processing execution unit is also made similarly. In the embodiment, the respective processing execution units for performing transmission and reception are provided in different information processing units, while both the processing execution units may be provided in the same information processing unit and even in this case the same processing operation is performed.

Further, the processing execution unit for performing transmission and reception may be the same and even in this case the same processing operation is performed. That is, a certain processing execution unit may transmit a message to itself. In addition, when the processing execution unit for performing transmission and reception is provided in the same information processing unit, it is not necessary to transmit the message through the communication medium 5001 and the message may be delivered from the transmission unit to the reception unit directly. As the format of the message used at this time, the format shown in FIG. 27 can be used, while the address of the destination-side information processing unit in the destination address portion 5071 or the address of the source-side information processing unit in the source address unit 5074 is not necessarily required.

The transmission processing of the source-side information processing unit is first described.

The processing execution unit 5030 of the source-side information processing unit 5002 outputs data of a processed result to be informed to another information processing unit, for example, the information processing unit 5003 or data relative to an inquiry to the processing execution unit 5060 of, for example, the information processing unit 5003 when there is the inquiry together with the destination address portion 5071 of the destination-side information processing unit 5003 and the reception unit 5050, the identifier portion 5072 and the designated time of the reception designation time portion 5073. In the embodiment, the message produced by the processing execution unit 5030 is delivered to the transmission management unit 5011 provided in the transmission unit 5010.

Figure 28:
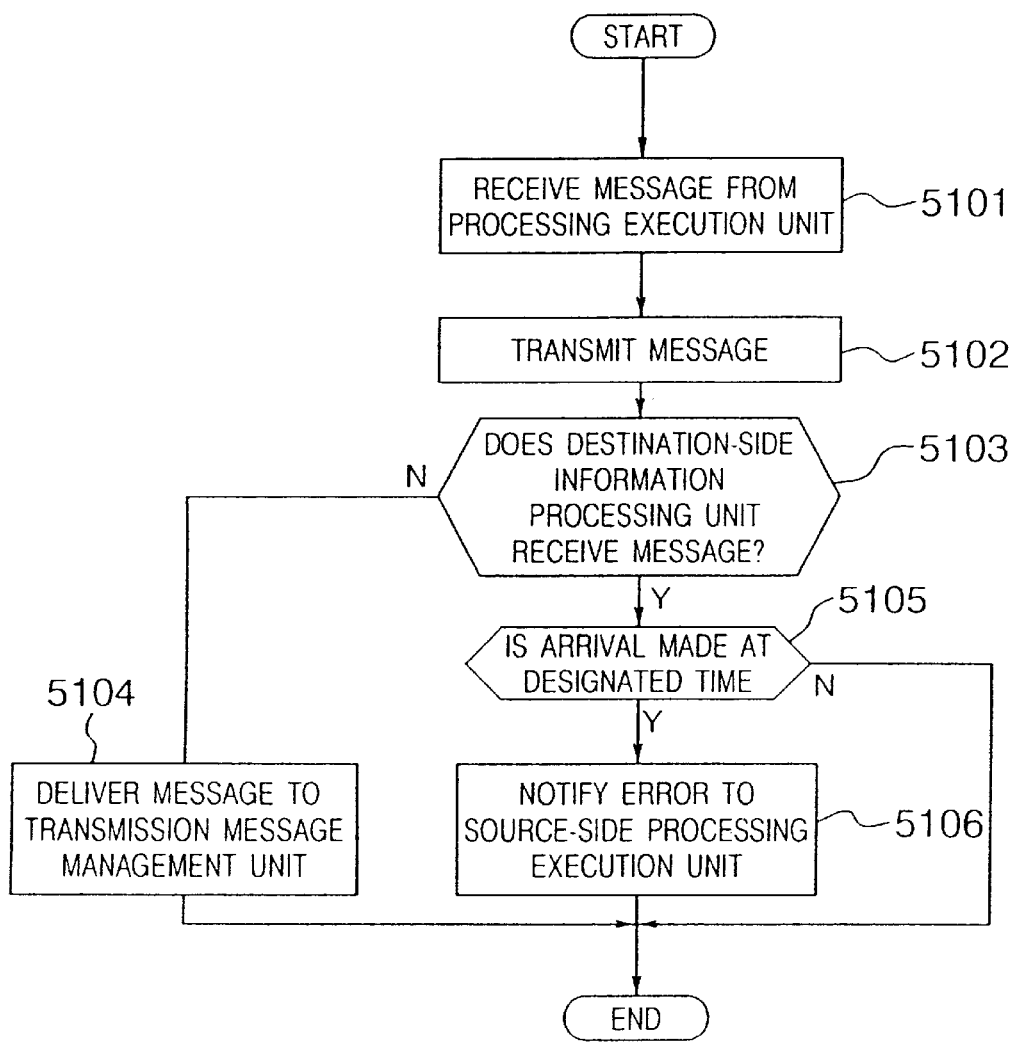
FIG. 28 is a flow chart showing a processing procedure of a transmission management unit 5011 of FIG. 26.

FIG. 28 is a flow chart showing a processing procedure of the transmission management unit 5011 in the transmission unit 5010 of the source-side information processing unit 5002 in the case where the message is transmitted from the source-side information processing unit 5002 to the destination-side information processing unit 5003.

The transmission management unit 5011 in the transmission unit 5010 first receives the transmission message 5070 having the designated destination address from the processing execution unit 5030 (step 5101). The transmission message 5070 is transmitted to the destination with reference to the destination address portion 5071 of the transmission message 5070 (step 5102).

The transmission management unit 5011 receives a message for confirmation of the reception from the destination-side information processing unit 5003 so as to confirm whether the destination-side information processing unit 5003 receives the transmission message or not. When it is confirmed that the transmission message is received by reception of the reception confirmation message, the process proceeds to step 5105 and when it is impossible to confirm that the transmission message is received, the process proceeds to step 5104 (step 5103).

The case where it is impossible to confirm that the destination-side information processing unit receives the message includes the case where a response indicating that the destination is not in the receivable state of the message is received or the case where the reception confirmation message is not returned within a fixed time or the case where any communication failure occurs or the like.

When it is impossible to confirm that the destination-side information processing unit receives the message, the transmission message is delivered to the transmission message management unit 5012 (step 5104). The transmission message management unit 5012 stores the message to the transmission message queue 5013 and the process is finished.

On the other hand, when it is possible to confirm that the destination-side information processing unit receives the message, it is judged from the contents of the confirmation message whether arrival at the destination of the transmission message is made at the time designated by the reception designation time portion 5073 of the message or not (step 5105). When the arrival is not made at the time, an error is notified to the source-side processing execution unit 5030 to abandon the message (step 5106) and the transmission process is finished.

When the arrival at the destination of the transmission message is made at the time designated by the reception designation time portion 5073 of the message, the process is completed normally.

In FIG. 28, when it is not necessary to confirm whether the destination-side information processing unit receives the message or not, the process may be finished immediately after step 5102 is completed. Further, when the retransmission process is not required, the reception confirmation message is received from the destination-side information processing unit and when the destination-side information processing unit cannot receive the message, the process may proceed to step 5106 directly instead of step 5104.

The retransmission process of the transmission message is now described.

Figure 29:
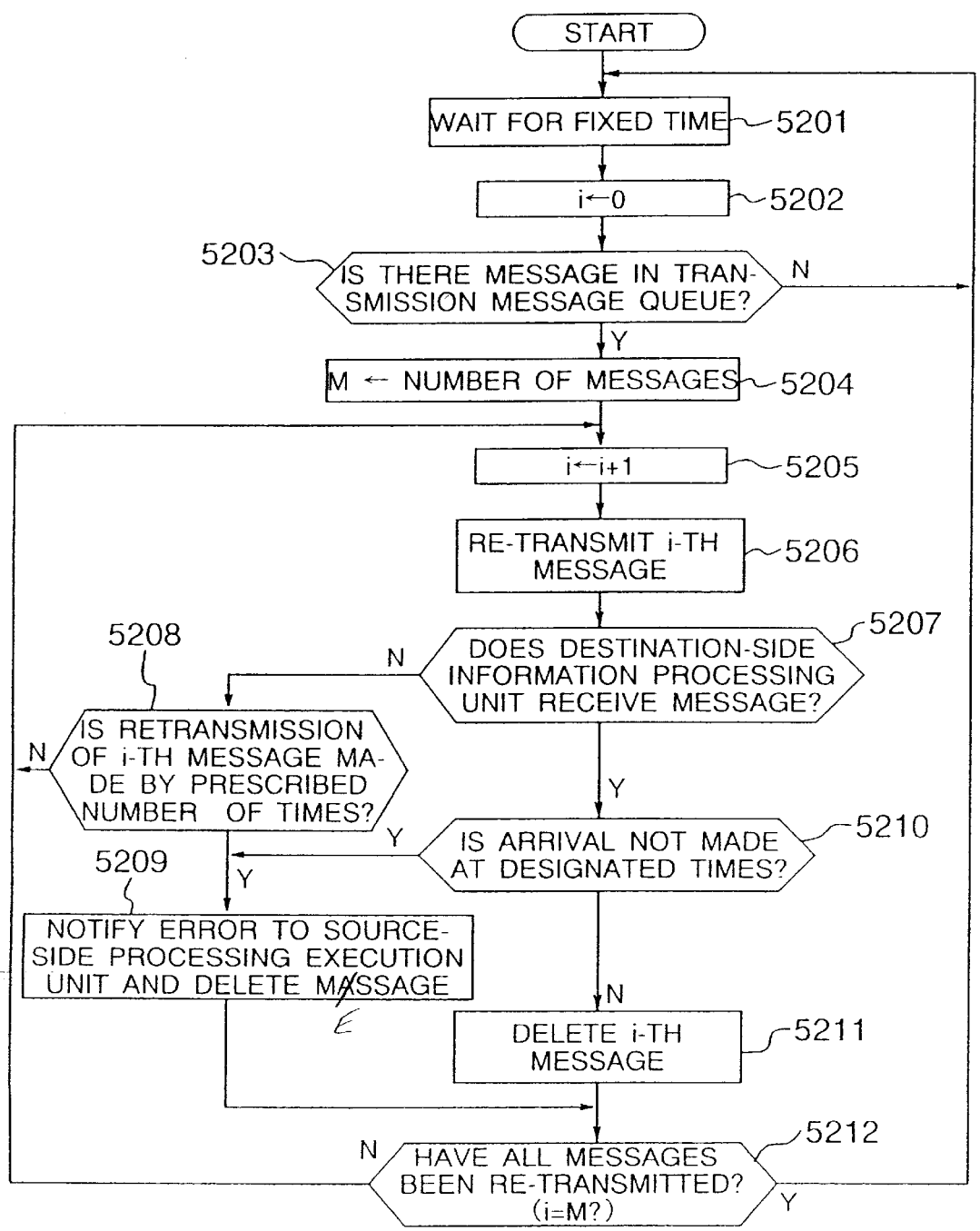
FIG. 29 is a flow chart showing a processing procedure of a transmission message management unit 5013 when a retransmission message is transmitted in FIG. 26.

FIG. 29 is a flow chart showing the procedure of the transmission message management unit 5013 upon transmission of the retransmission message. First, the process waits for a fixed time designated previously as a retransmission execution interval (step 5201).

Then, a counter i for counting the number of messages in the transmission queue 5013 is reset to 0 (step 5202). It is examined whether there are messages in the transmission message queue 5013 or not. When there is no message, the process is returned to step 5201 and when there are messages, the process proceeds to step 5204 (step 5203).

When there are messages in the transmission queue 5013, the number of messages is M (step 5204) and i+1 is substituted for i (step 5205). The i-th transmission message is copied and taken out from the transmission message queue 5013 and is re-transmitted (step 5206).

When the reception confirmation message is received from the destination-side information processing unit and it is confirmed that the destination-side information processing unit receives the message, the process proceeds to step 5210 and otherwise the process proceeds to step 5208 (step 5207).

When it is impossible to confirm that the destination-side information processing unit receives the message (in case of no in step 5207), the number of times of retransmission of the message is examined and it is judged whether the number of times of retransmission reaches a predetermined number of times or not (step 5208). When the number of times of retransmission reaches the predetermined number of times (in case of yes in step 5208), an error is notified to the source-side processing execution unit and the message is deleted from the transmission message queue 5013 (step 5209). Then, the process proceeds to step 5212. When the number of times of retransmission does not reach the predetermined number of times (in case of no in step 5208), the process proceeds to step 5205 in which i is incremented to i+1 and the (i+1)-th transmission message is re-transmitted.

In step 5207, when it is possible to confirm that the destination-side information processing unit receives the message (in case of yes in step 5207), it is judged from the contents of the confirmation message whether arrival at the destination of the transmission message is made at the time designated by the reception designation time portion 5073 of the message or not (step 5210). When the arrival at the destination of the transmission message is not made at the time designated by the message (in case of yes in step 5120), an error is notified to the source-side processing execution unit 5030 and the message is deleted from the transmission message queue 5013 (step 5209). The process proceeds to step 5212.

When the arrival is made at the designated time (in case of no in step 5210), the i-th message is deleted (step 5211) and the process proceeds to step 5212.

In step 5212, it is judged whether all of transmission messages stored in the transmission message queue 5013 have been re-transmitted or not (i=M?). When there is the transmission message which has not been re-transmitted yet (in case of i<M or in case of no in step 5212), the process is returned to step 5205. when all of transmission messages have been re-transmitted (in case of i=M or in case of yes in step 5212), the process proceeds to step 5201 in which the process waits for starting of the next retransmission process.

The reception process of the information processing unit on the reception side is now described. The transmission message transmitted from the source-side information processing unit 5002 is received by the reception management unit 5051 in the reception unit 5050 of the information processing unit 5003 on the reception side (destination-side).

Figure 30:
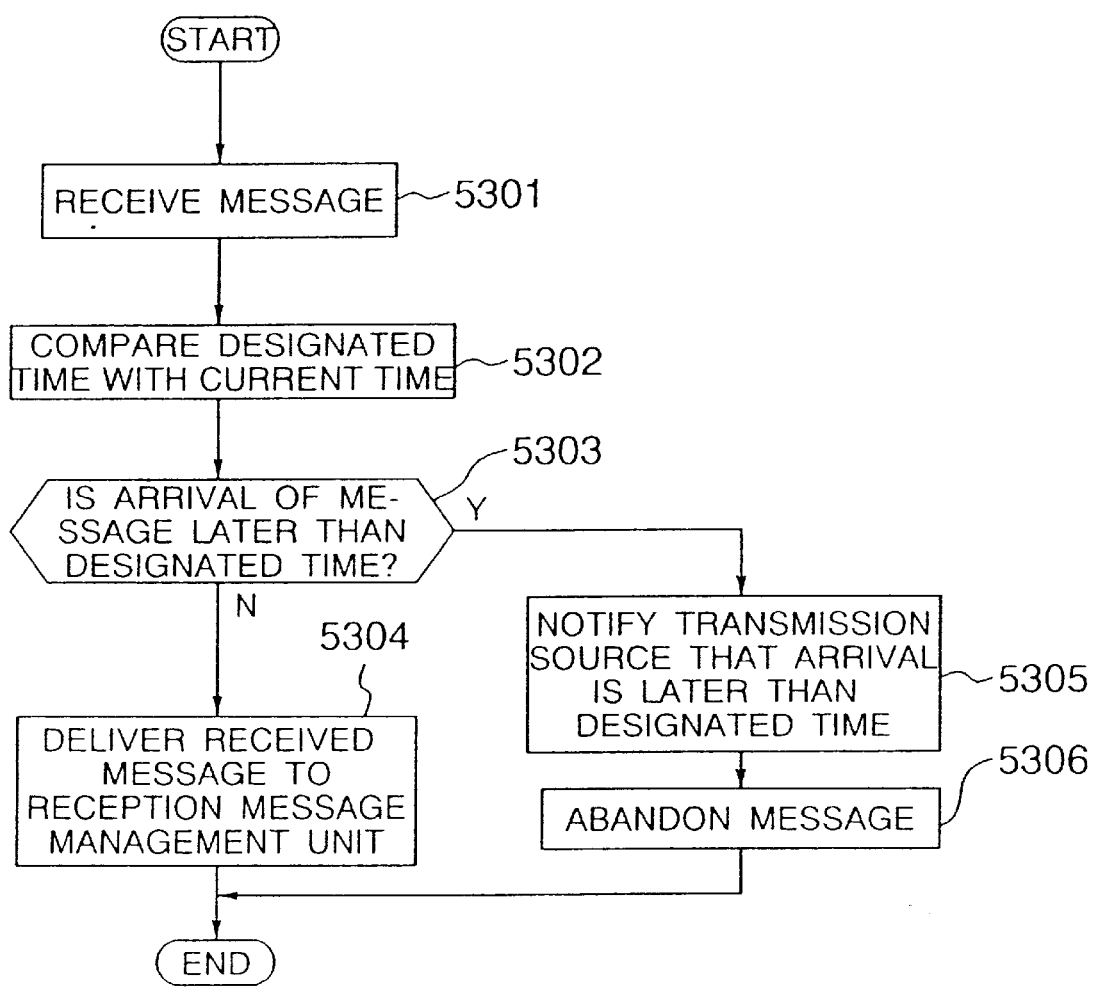
FIG. 30 is a flow chart showing a processing procedure upon reception of a message of a reception management unit 5051 of FIG. 26.

FIG. 30 is a flow chart showing the procedure of the reception management unit 5051 upon reception of the message.

When the reception management unit 5051 receives the message (step 5301), the contents of the reception designation time portion 5073 in the received message is compared with the current time of the clock held in its own information processing unit (step 5302) and it is judged whether arrival of the message is later than the designated time or not (step 5303).

When the arrival is later (in case of yes in step 5303), the transmission source is notified that the arrival of the message is not made at the designated time (step 5305) and the received message is abandoned (step 5306). The process is finished.

When the arrival is made at the designated time, the received message is delivered to the reception message management unit 5052 (step 5304) and the process is finished.

The delivery of the received message to the processing execution unit 5060 in the information processing unit 5003 on the reception side is now described. The delivery of the received message to the processing execution unit 5060 is made by the reception message management unit 5052.

Figure 31:
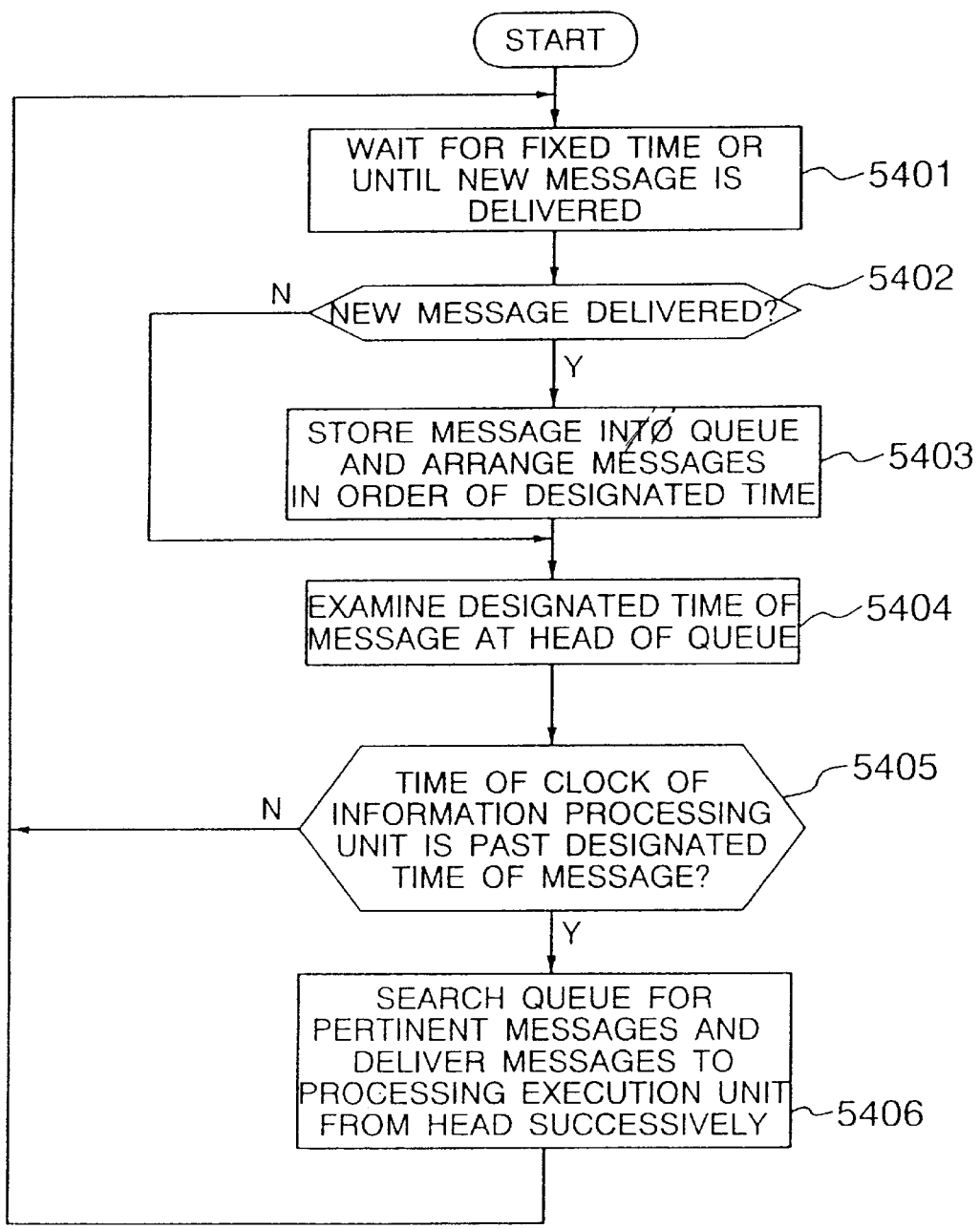
FIG. 31 is a flow chart showing a processing procedure at the time when the reception message management unit 5052 delivers a reception message to a processing execution unit 5060 in FIG. 26.

FIG. 31 is a flow chart showing the processing procedure upon delivery of the received message to the processing execution unit 5060 by the reception message management unit 5052.

The reception message management unit 5052 waits for a fixed time previously designated as a delivery execution interval of the received message to the processing execution unit or until a new message is delivered from the reception management unit 5051 (step 5401).

It is judged whether a new received message is delivered or not (step 5402). when a new received message is delivered (in case of yes in step 5402), the received message is stored in the reception message queue 5053 and the contents of the respective reception designation time portions 5073 of the messages in the reception message queue 5053 are examined so that the received messages are arranged in order of earlier reception designation times (step 5403). At this time, a rule that when there are messages having the same reception designation times, the received message is inserted just before or after the reception is previously determined and the arrangement of the received messages is made in accordance with the rule.

Subsequently to step 5403 or after elapse of a very short fixed time previously designated in step 5401, the process proceeds to step 5404. In step 5404, the reception designation time portion 5073 of the received message at the head of the reception message queue 5053 is examined. The time indicated by the reception designation time portion 5073 is compared with the current time of the clock held in the its own information processing unit so that it is judged whether the current time of the clock held in the information processing unit is past the reception designation time of the received message at the head or not (step 5405).

When the current time of the clock held in its own information processing unit is past or equal to the reception designation time of the received message at the head (in case of yes in step 5405), pertinent messages are searched from the reception message queue 5053 from the head thereof successively so that the pertinent messages are delivered to the processing execution unit designated by the destination-side processing execution unit identifier portion 5072 of the received message from the head successively and are deleted from the queue (step 5406) and the process is returned to step 5401.

In step 5404, when the current time of the clock held in its own information processing unit does not reach the reception designation time of the received message at the head yet (in case of no in step 5404), the process is returned to step 5401 as it is.

Figure 32:
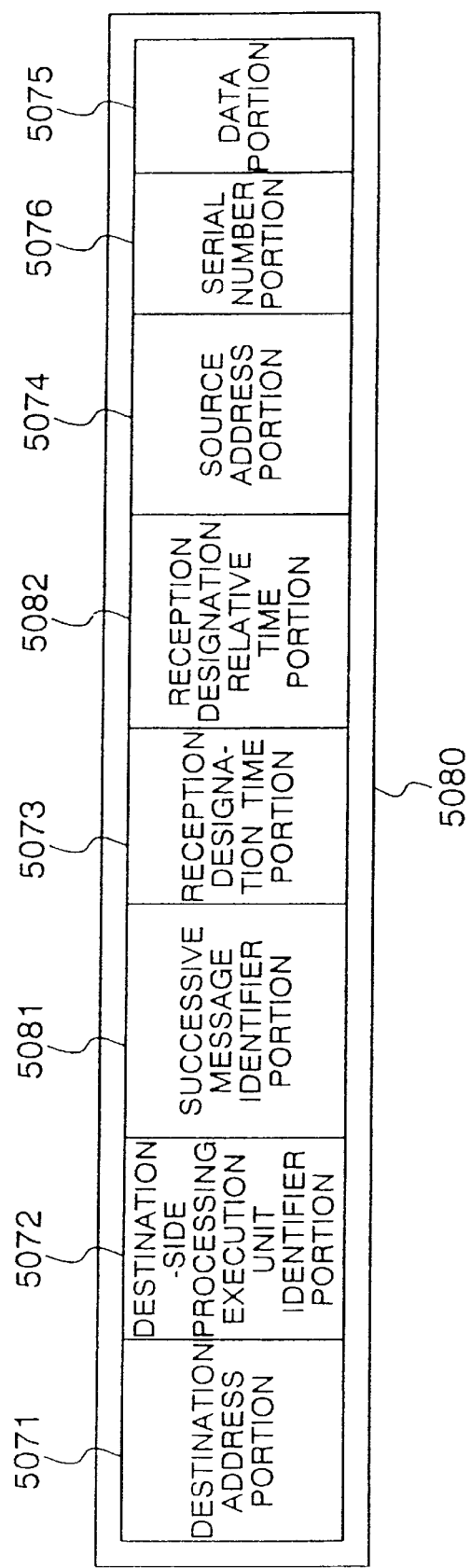
FIG. 32 shows an example of a format of a message 5080 used in an embodiment 7.

The embodiment 6 has been described, while the present invention is not limited to this embodiment. For example, the definite format of the transmission message is not limited to the embodiment, while a serial number may be given to the designated time as shown in FIG. 32 and when there are a plurality of messages having the same designated time in the process of step 5403 of FIG. 31, the plurality of messages may be arranged in order of the serial number.

Further, the process in step 5406 of FIG. 31 may be changed as follows. When the current time of the clock held in its own information processing unit is past or equal to the transmission designation time designated by the reception designation time portion 5073 of the received message at the head of the reception message queue 5053, the pertinent messages are searched from the head of the reception message queue 5053 successively and the processing execution unit designated by the destination-side processing execution unit identifier portion 5072 of the received message is started so that the pertinent messages are delivered to the processing execution unit from the head successively and are deleted from the reception message queue 5053. The process is returned to step 5401.

In addition, when the source-side processing execution unit transmits the same message to a plurality of processing execution units at the same designated time, the same process as that described in the embodiment 6 is made in each of the reception-side information processing units so that the same message can be delivered to the processing execution units of the plurality of information processing units at the designated time simultaneously or the designated processing execution units can be started simultaneously to deliver the same message simultaneously.

Further, when the source-side processing execution unit transmits a plurality of messages having the continuity of time while designating the reception designation time to each of the plurality of messages and even when the plurality of messages are not transmitted in order of the reception designation time, the reception-side information processing unit can arrange the messages in order of the designated time without the transmission order and the processing execution unit can receive the messages in order of the designated time. When a plurality of reception-side processing execution units are provided in a plurality of information processing units, the above operation is made similarly.

[Embodiment 7]

The embodiment 7 is now described.

Description is made to the case where the embodiment 7 is applied to a communication method in which animation data or voice reproduction data are transmitted to the reception-side information processing unit and are delivered to the processing execution unit at the designated time to be reproduced.

Generally, data such as animation data and voice reproduction data can be divided in the time series manner. The source-side processing execution unit divides the whole data to be transmitted in the time series manner and transmits the data as messages successively. On the other hand, the reception-side processing execution unit receives the messages successively and reproduces the messages successively. For example, animation is composed of collected pictures each named a cell generally and the collected pictures are displayed successively in the time series manner to reproduce the animation. The source-side processing execution unit divides the whole data into a plurality of data each constituting one picture in the time series manner and transmits the plurality of data as messages successively. The reception-side processing execution unit receives the messages successively and reproduces the messages successively. In the embodiment 7, substantially the same processing as that of the embodiment 6 is performed and accordingly only different portion is now described.

FIG. 32 shows an example of a format of a message 5080 used in the embodiment 7 and transmitted and received among a plurality of information processing units.

Only portion different from the format of the message used in the embodiment 6 is described.

The message 5080 includes a successive message identifier portion 5081 and a reception designation relative time portion 5082 added newly. The successive message identifier portion 5081 holds an identifier for causing the reception-side information processing unit which receives a series of messages divided in the time series manner such as a plurality of various animation data and voice reproduction data to identify a kind of undivided data constituting the messages. The identifier is given by the source-side processing execution unit. The messages produced by dividing the same data are given the same identifier. The reception designation relative time portion 5082 preserves a reception designation time as a relative time. The relative reception designation time is a relative time to the reception designation time given to a first message of a series of messages by the source-side processing execution unit. The reception designation relative time is given by the source-side processing execution unit. Time expressed in a unit of, for example, minute, second, millisecond or the like is designated as the reception designation relative time.

The processing performed by the source-side processing execution unit 5030 is now described.

Upon transmission of a series of successive messages, the source-side processing execution unit 5030 sets an identifier for causing the reception-side information processing unit which receives the series of messages divided in the time series manner such as a plurality of kinds of animation data and voice reproduction data to identify the kind of undivided data constituting the messages into the successive message identifier portion 5081 in the message 5080. The unit 5030 further sets the time that the reception-side processing execution portion receives the messages into the reception designation time portion 5073 in the first message of the series of transmitted messages. The unit 5030 furthermore sets the reception designation times as relative times to the reception designation time set in the message transmitted as the first message of the series of messages into the reception designation relative time portion 5082 in the second and subsequent messages of the series of transmitted messages to transmit the messages. However, the reception time of the message is set into the reception designation time portion 5073 of the first message but any time is not set into the reception designation relative time portion 5082 thereof. Further, the relative time is set into the reception designation relative time portions 5082 of the second and subsequent messages but any time is not set into the reception designation time portion 5073.

A serial number for each of a series of messages transmitted by the source-side processing execution unit is set in the serial number portion 5076. The serial number is set to examine whether the messages are missing or not and does not serve to designate that the messages are delivered to the processing execution unit on the reception side in order of the serial number. Information capable of identifying the last message at the reception-side information processing unit is set in the serial number portion 5076 of the last message of the series of messages together with the serial number. The destination address portion 5071, the destination-side processing execution unit identifier portion 5072, the source address portion 5074 and the data portion 5075 other than the serial number portion are set in the same manner as in the embodiment 6.

The processing of the reception unit 5050 of the reception-side information processing unit is now described.

Upon reception of the messages 5080, the reception unit 5050 of the reception-side information processing unit examines the contents of the reception designation time portion or the reception designation relative time portion set in the messages and calculates a time that the messages are delivered to the processing execution unit 5060 to control so that the messages are delivered to the processing execution unit at the calculated time. Even when the reception unit 5050 does not receive all of the series of messages, the reception unit can perform processing from the received portion of messages successively to attain the control.

In the embodiment 7, the processing performed in step 5301 of the flow chart showing the reception process of the reception management unit 5051 shown in FIG. 30 is modified as follows.

When the reception unit 5050 receives the first message of the series of messages identified by the successive message identifier portion 5081, the reception unit stores the correspondence of the reception designation time portion 5073 designated in the message and the successive message identifier portion 5081 therein. The reception unit 5050 can judge on the basis of the time designated in the reception designation time portion 5073 of the message or the serial number stored in the serial number portion 5076 which message of the series of messages identified by the successive message identifier portion 5081 is the first message.

Further, when the reception unit 5050 receives the second and subsequent messages of the series of messages identified by the successive message identifier portion 5081, the reception unit calculates the reception designation times of the received messages on the basis of the correspondence information of the successive message identifier portion 5081 and the reception designation time portion 5073 stored therein and information in the successive message identifier portions 5081 and the reception designation relative time portions 5082 set in the received messages and writes the calculated values in the reception designation time portions 5073. When the reception unit 5050 receives the last message of the series of messages identified by the successive message identifier portion 5081, the reception unit performs the above processing and deletes the correspondence information of the reception designation time portion 5073 and the successive message identifier portion 5081 stored therein.

When the second and subsequent messages are received before the first message is received, the second and subsequent messages are stored therein as they are until the first message is received.

Further, the reception unit 5050 examines whether the messages are missing or not on the basis of the serial numbers. When the reception unit receives the last message before all of messages are received, the reception unit stores the correspondence information of the reception designation time portion 5073 and the successive message identifier portion 5081 as it is without deletion until the reception unit receives messages which are not received yet. This information is deleted by the reception unit 5050 when the time designated in the reception designation time portion 5073 is reached.

The processes other than the above modified process in step 5301 are the same as in the embodiment 6.

The reception message management unit of the reception-side information processing unit may store the time that the first message of the series of messages is delivered to the processing execution unit and may perform the processing at the relative times to the stored time without designating the execution time of the first message of the series of messages by the reception designation time portion 5073.

As described above, in the embodiment 7, since the designation time to be delivered is given, the transmission side can prepare scheduling for the transmission order and timing. Further, since retransmission can be made even when the reception side is not in the receivable state or when the network fails, preferred transmission can be attained in consideration of load on the transmission and reception side, load of the network, the state on the reception side and the like. Particularly, when there are lots of programs on the transmission side and transmission information, load of the programs on the transmission side can be suppressed.

What is claimed is:

1. A method for defining program execution in a distributed system wherein a plurality of processors are connected via a network, a plurality of programs are distributed to said processors, and among said programs, a reception-side program on a side of receiving a message executes processing using said message transmitted from a transmission-side program on a side of transmitting said message, said method comprising:

a first step of displaying a plurality of program icons indicating said plurality of programs, respectively;

a second step of entering designation of two program icons contained in said plurality of program icons being displayed, and a linkage icon indicating transmission/reception of a message between two programs;

a third step of displaying said linkage icon so as to make a corresponding relationship between said two programs, responding to said second step;

a fourth step of entering a start condition indicating a condition for a reception-side program with regard to said linkage icon being displayed to start a message corresponding to said linkage icon; and a fifth step of displaying a start-condition icon corresponding to said start condition thus entered so as to make a corresponding relationship to said linkage icon, responding to said fourth step, wherein a reception-side program of two programs corresponding to said two program icons executes processing related to said message corresponding to said linkage icon, according to said start condition indicated by said start-condition icon.

2. The method according to claim 1, further comprising the step of defining a linkage corresponding to said linkage icon, responding to entering in said second step, said linkage indicating that there is transmission/reception of said message between said two programs respectively corresponding to said two program icons designated.

3. The method according to claim 1, wherein said start condition includes a start type indicating a type of starting and a start parameter indicating a parameter of the starting.

4. The method according to claim 3, wherein said start type is one of a delayed time start to start execution of processing at a predetermined time after said message is received, a periodic start to start execution of processing at predetermined intervals, and a time start to start execution of processing at a predetermined time.

5. The method according to claim 3, wherein said start parameter is information concerning time corresponding to said start type.

6. The method according to claim 1, further comprising the steps of:

reading said start condition and program identification information for identifying at least programs indicated by said two program icons;

allocating a content code indicating a content of said message corresponding to said linkage icon to said message; and creating a content code management table for said linkage icon, said content code management table defining said program identification information thus read, said start condition thus read and said content code.

7. The method according to claim 6, wherein when receiving said message, a program indicated by said program identification information thus read executes processing related to said message according to a start condition corresponding to a content code in said content code management table of said message thus received.

8. A computer program product storable on a computer readable storage medium, for defining program execution in a distributed system wherein a plurality of processors are connected via a network, a plurality of programs are distributed to said processors, and among said programs, a reception-side program on a side of receiving a message executes processing using said message transmitted from a transmission-side program on a side of transmitting said message, said program causing a computer to execute:

a first step of displaying a plurality of program icons indicating said plurality of programs, respectively;

a second step of entering designation of two program icons contained in said plurality of program icons being displayed, and a linkage icon indicating transmission/reception of a message between two programs;

a third step of displaying said linkage icon so as to make a corresponding relationship between said two programs, responding to said second step;

a fourth step of entering a start condition Indicating a condition for a reception-side program with regard to said linkage icon being displayed to start a message corresponding to said linkage icon; and a fifth step of displaying a start-condition icon corresponding to said start condition thus entered so as to make a corresponding relationship to said linkage icon, responding to said fourth step, wherein a reception-side program of two programs corresponding to said two program icons executes processing related to said message corresponding to said linkage icon, according to said start condition indicated by said start-condition icon.

9. The program product according to claim 8, further comprising the step of defining a linkage corresponding to said linkage icon, responding to entering in said second step, said linkage indicating that there is transmission/reception of said message between said two programs respectively corresponding to said two program icons designated.

10. The program product according to claim 8, wherein said start condition includes a start type indicating a type of starting and a start parameter indicating a parameter of the starting.

11. The program product according to claim 10, wherein said start type is one of a delayed time start to start execution of processing at a predetermined time after said message is received, a periodic start to start execution of processing at predetermined intervals, and a time start to start execution of processing at a predetermined time.

12. The program product according to claim 11, wherein said start parameter is information concerning time corresponding to said start type.

13. The program product according to claim 8, causing said computer to further execute the steps of:
reading said start condition and program identification information for identifying at least programs indicated by said two program icons;
allocating a content code indicating a content of said message corresponding to said linkage icon to said message; and
creating a content code management table for said linkage icon, said content code management table defining said program identification information thus read, said start condition thus read and said content code.

14. The program product according to claim 13, wherein when receiving said message, a program indicated by said program identification information thus read executes processing related to said message, according to a start condition corresponding to a content code in said content code management table of said message thus received.

15. An apparatus for defining program execution in a distributed system wherein a plurality of processors are connected via a network, a plurality of programs are distributed to said processors, and among said programs, a reception-side program on a side of receiving a message executes processing using said message transmitted from a transmission-side program on a side of transmitting said message, said apparatus comprising:
a display device;
an input device for entering input from a user; and a processing device connected to said display device and said input device, which:
displays a plurality of program icons indicating said plurality of programs, respectively, on said display device;
responsive to input from said input device concerning two program icons contained in said plurality of program icons being displayed, and a linkage icon indicating transmission/reception of a message between two programs, displays said linkage icon so as to make a corresponding relationship between said two programs; and
responsive to input from said input device concerning a start condition indicating a condition for a reception-side program with regard to said linkage icon being displayed to start a message corresponding to said linkage icon, displays on said display device a start-condition icon corresponding to said start condition thus entered so as to make a corresponding-relationship to said linkage icon,
wherein a reception-side program of two programs corresponding to said two program icons executes processing related to said message corresponding to said linkage icon, according to said start condition indicated by said start-condition icon.

16. The apparatus according to claim 15, wherein said processing device further defines a linkage corresponding to said linkage icon, said linkage indicating that there is transmission/reception of said message between said two programs respectively corresponding to said two program icons designated.

17. The apparatus according to claim 15, wherein said start condition includes a start type indicating a type of starting and a start parameter indicating a parameter of the starting.

18. The apparatus according to claim 17, wherein said start type is one of a delayed time start to start execution of processing at a predetermined time after said message is received, a periodic start to start execution of processing at predetermined intervals, and a time start to start execution of processing at a predetermined time.

19. The apparatus according to claim 18, wherein said start parameter is information concerning time corresponding to said start type.

20. The apparatus according to claim 15, wherein said processing device further:
reads said start condition and program identification information for identifying at least programs indicated by said two program icons;
allocates a content code indicating a content of said message corresponding to said linkage icon to said message; and
creates a content code management table for said linkage icon, said content code management table defining said program identification information thus read, said start condition thus read and said content code.

21. The apparatus according to claim 20, wherein when receiving said message, a program indicated by said program identification information thus read executes processing related to said message according to a start condition corresponding to a content code in said content code management table of said message thus received.

* * * * *